(12) United States Patent
Bychkov et al.

(10) Patent No.: US 7,381,076 B2
(45) Date of Patent: Jun. 3, 2008

(54) THIN PERIPHERAL FOR MATING WITH THICKER CONNECTOR

(75) Inventors: Eyal Bychkov, Hod Hasharon (IL); Yohan Cohen, Hod Hasharon (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 11/304,746

(22) Filed: Dec. 16, 2005

(65) Prior Publication Data

US 2006/0154525 A1    Jul. 13, 2006

(51) Int. Cl.
  *H01R 4/50* (2006.01)
(52) U.S. Cl. .................. 439/344; 439/131; 439/377
(58) Field of Classification Search ............... 439/131, 439/377, 32, 374, 660, 946, 676, 344; 361/737
   See application file for complete search history.

(56) References Cited

U.S. PATENT DOCUMENTS

| | | | |
|---|---|---|---|
| 5,442,243 A | | 8/1995 | Bailey |
| 6,381,142 B1 * | | 4/2002 | Hasegawa .................. 361/737 |
| 6,883,718 B1 | | 4/2005 | Le et al. |
| 6,884,104 B2 * | | 4/2005 | Homer ...................... 439/344 |
| 2004/0259423 A1 | | 12/2004 | Elbaz |
| 2005/0042930 A1 | | 2/2005 | Harkabi et al. |
| 2006/0024997 A1 | | 2/2006 | Teicher |

FOREIGN PATENT DOCUMENTS

WO    WO2005/124932    12/2005

* cited by examiner

*Primary Examiner*—Michael C. Zarroli
(74) *Attorney, Agent, or Firm*—Mark M. Friedman

(57) ABSTRACT

A thin peripheral devices for mating with electrical connectors where the thickness of the device is less than the dimensions needed for mechanical engagement with the connector, has a body including electronic circuitry and a selectively deployable plug arrangement. The plug arrangement includes a first plug portion including a plurality of electric contacts and a second plug portion. At least part of the plug arrangement is selectively displaceable relative to a remainder of the body between a non-deployed configuration wherein the entire plug arrangement lies within a thickness dimension of the body and a deployed configuration wherein the first and second plug portions together define an effective plug having thickness greater than the thickness dimension of the body for mating with the electrical connector.

39 Claims, 34 Drawing Sheets

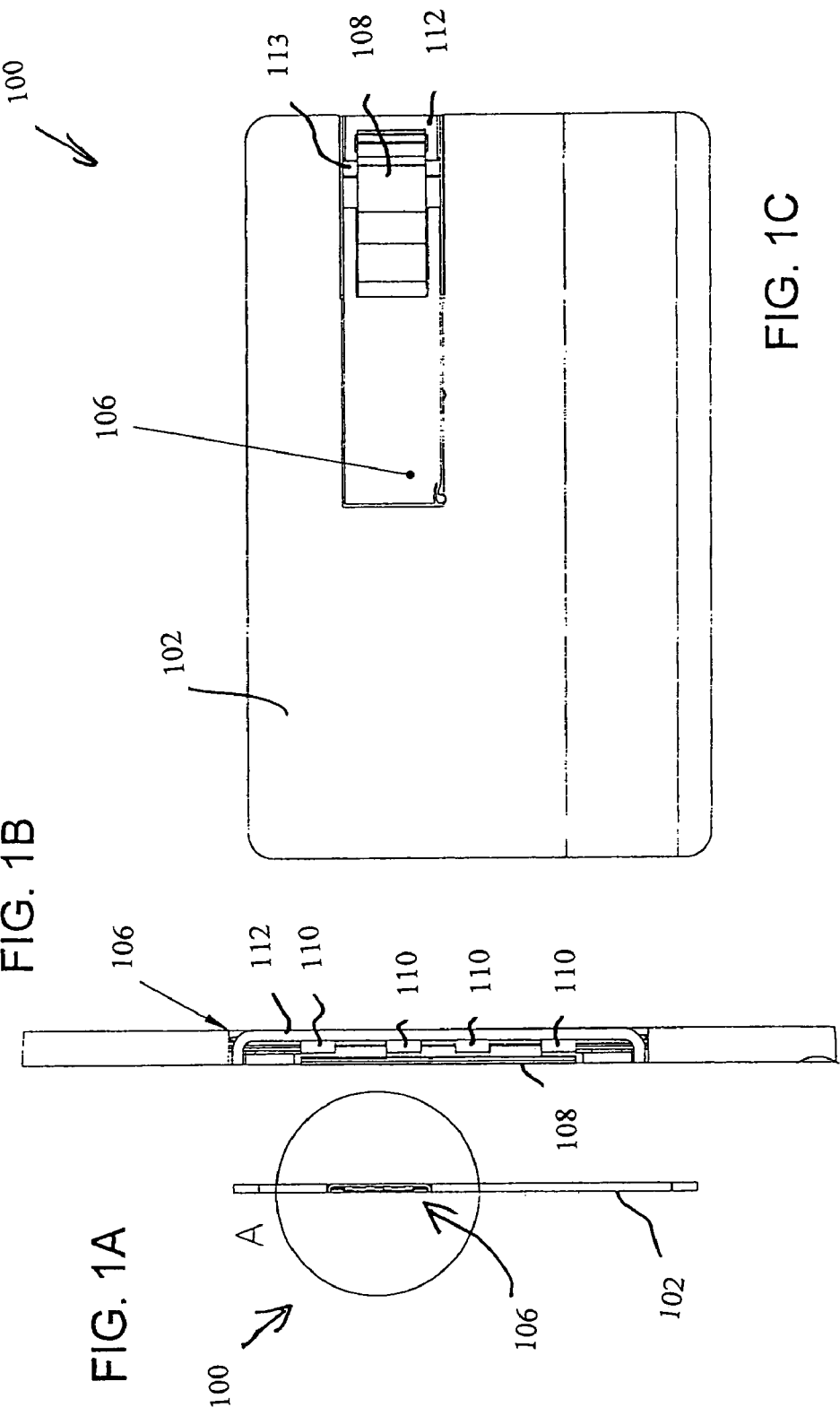

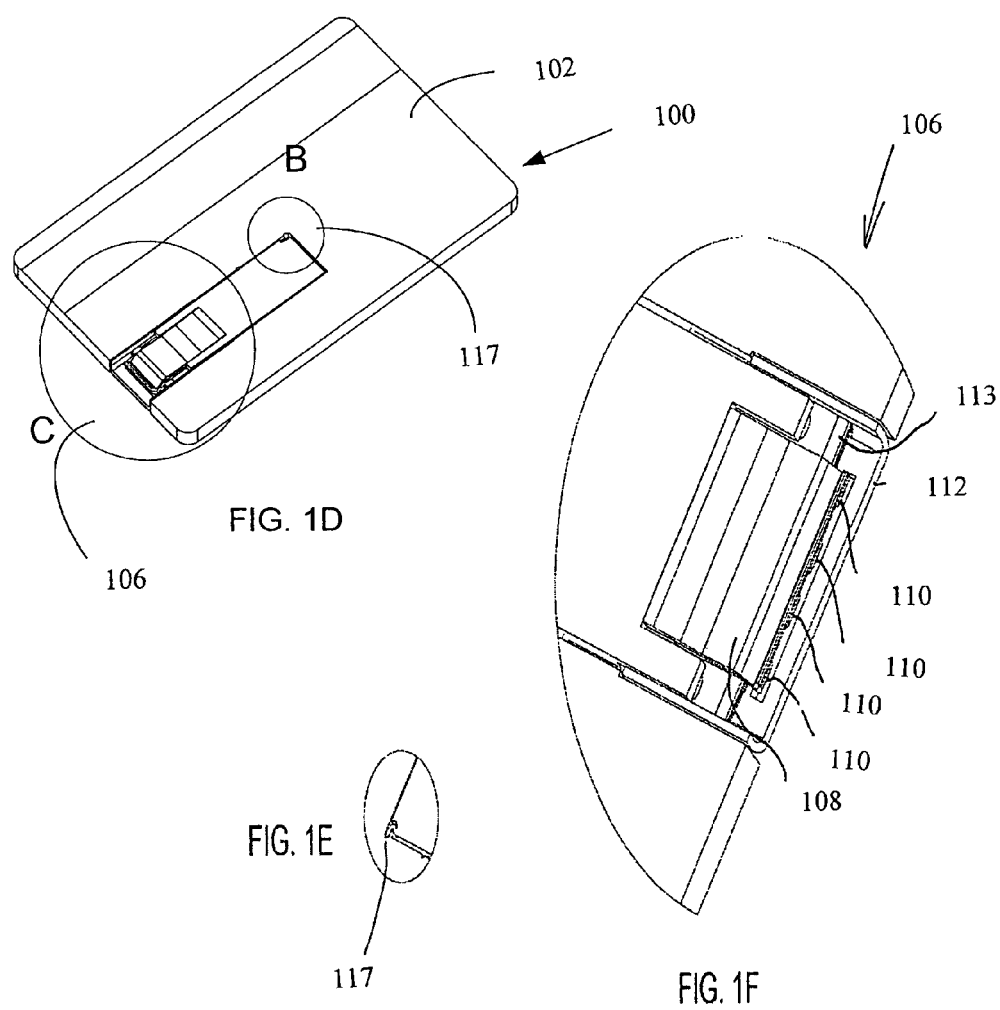

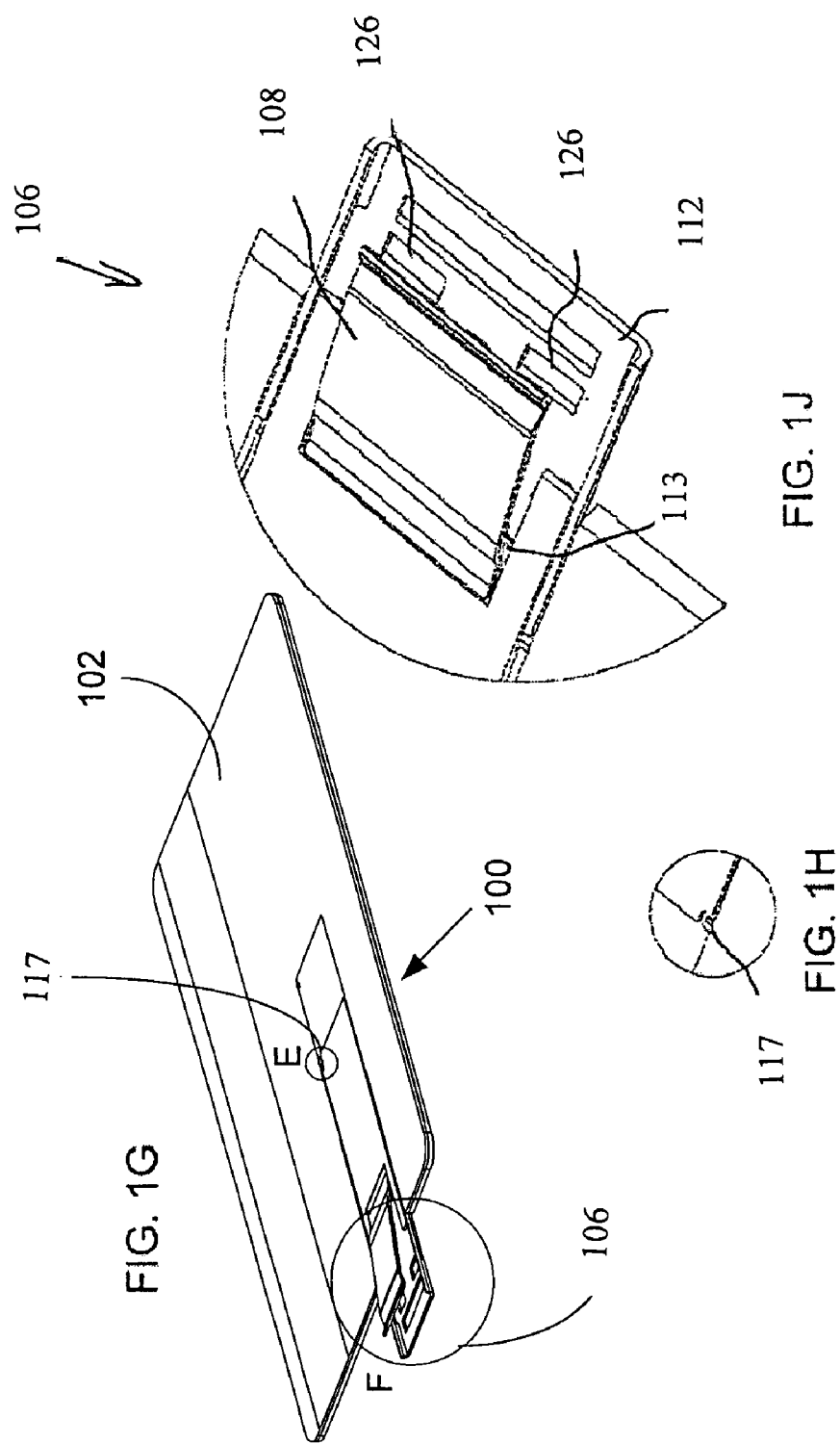

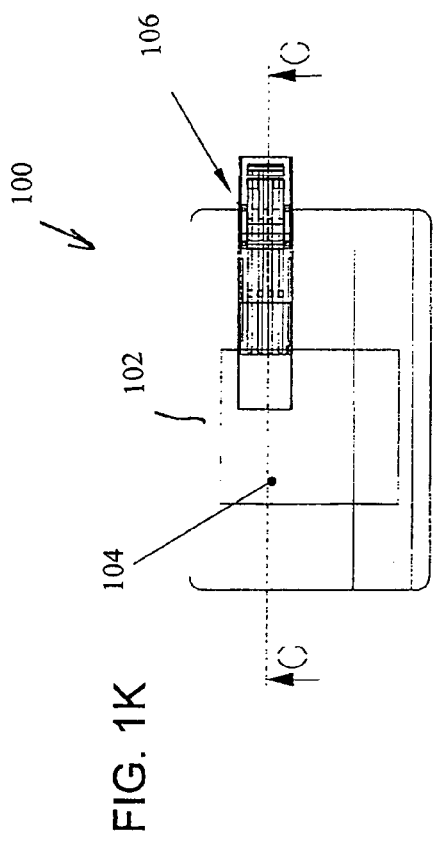
FIG. 1K
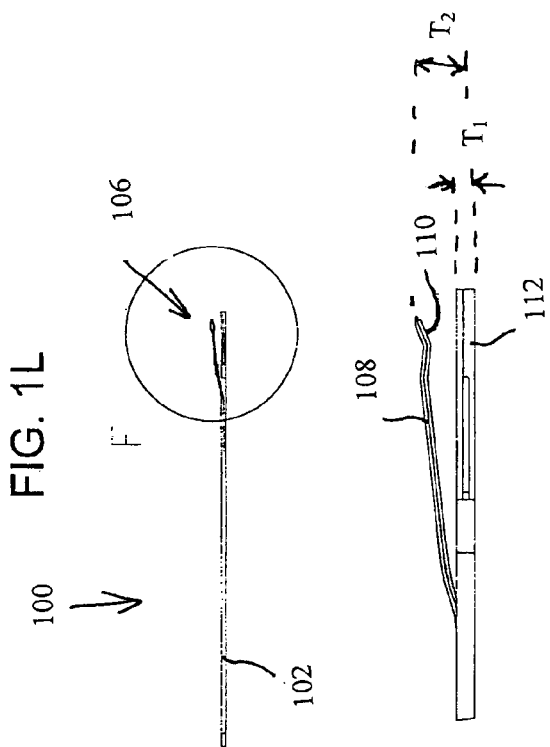
FIG. 1L
FIG. 1M

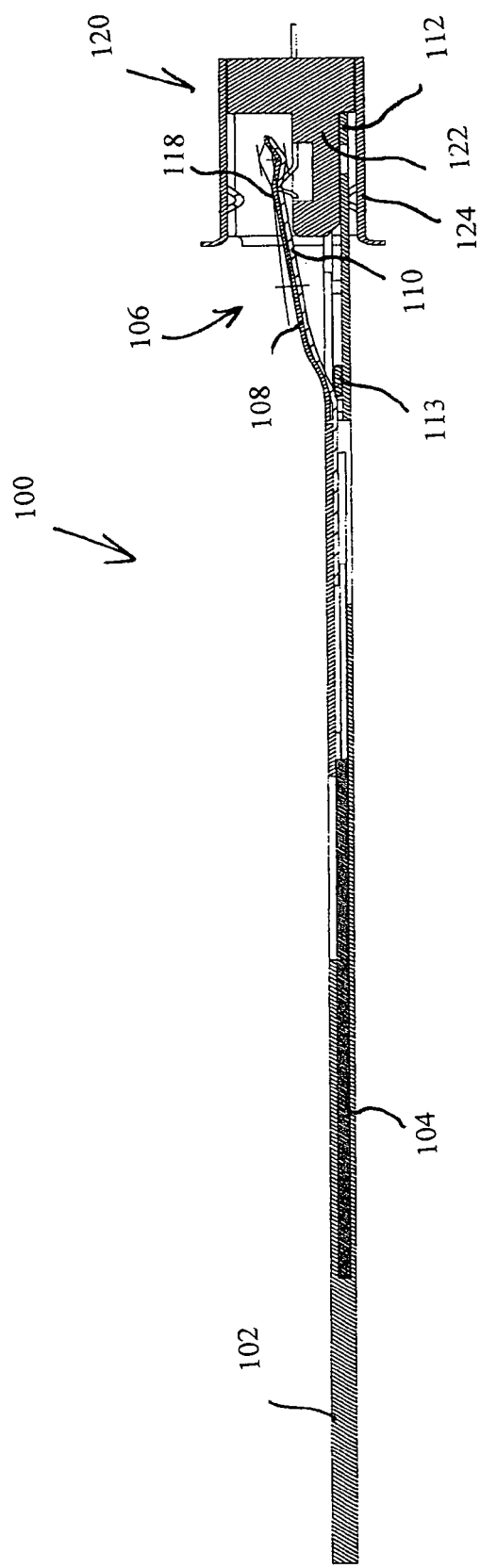

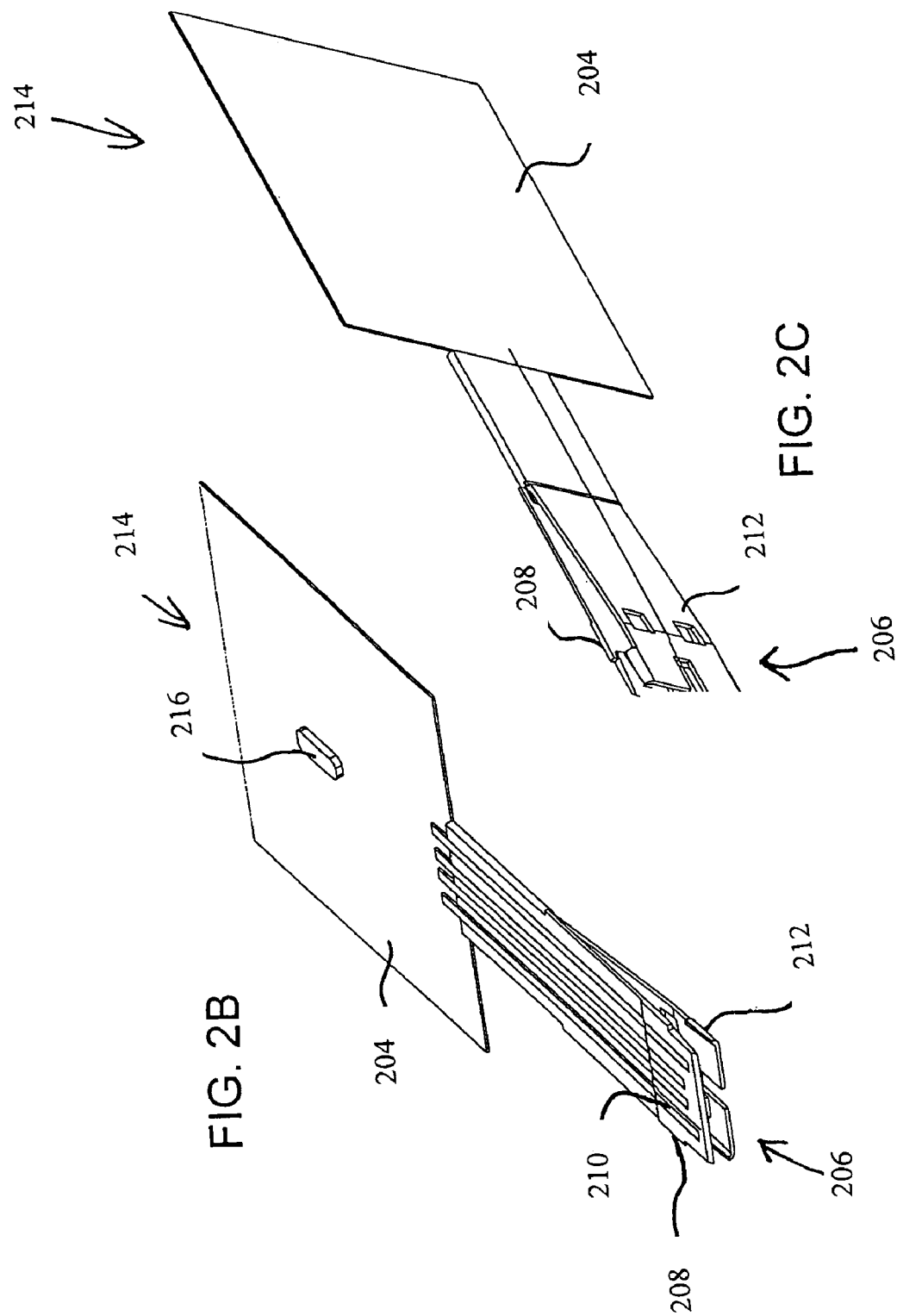

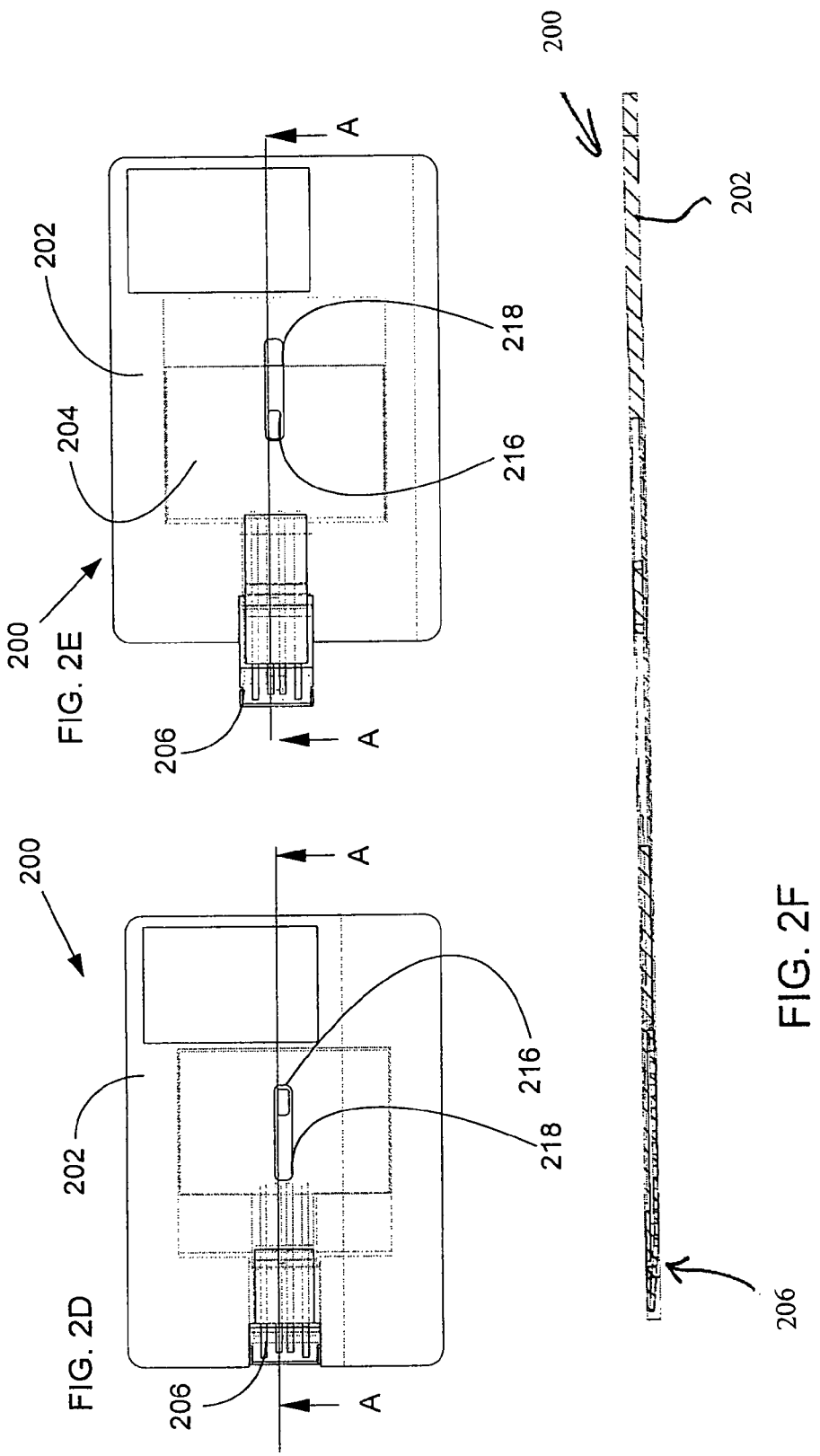

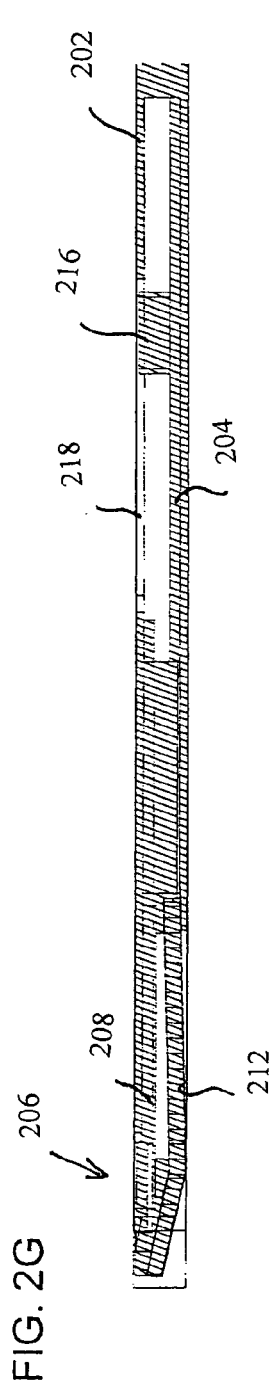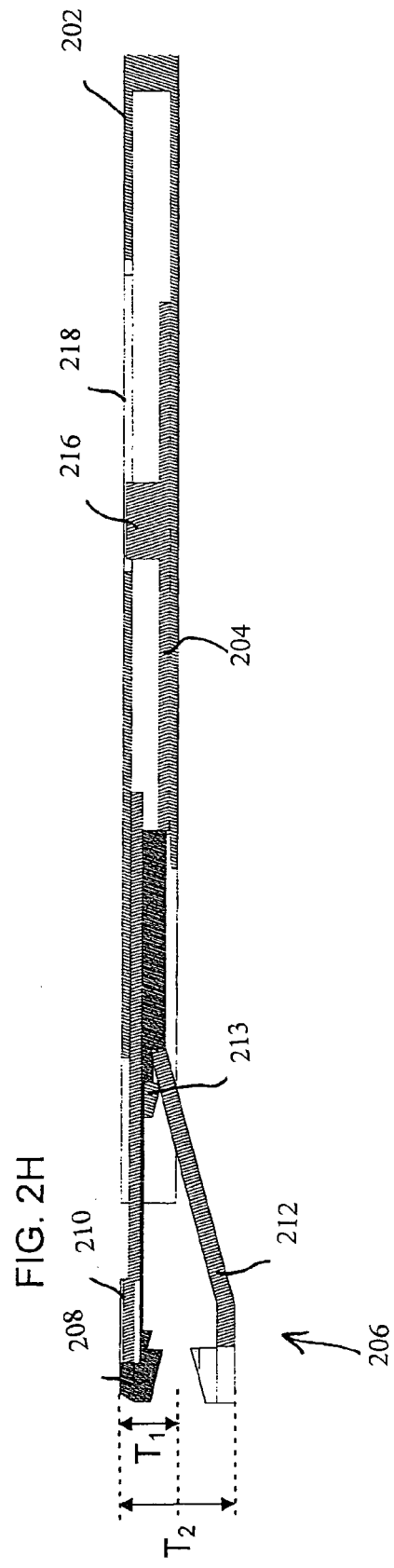

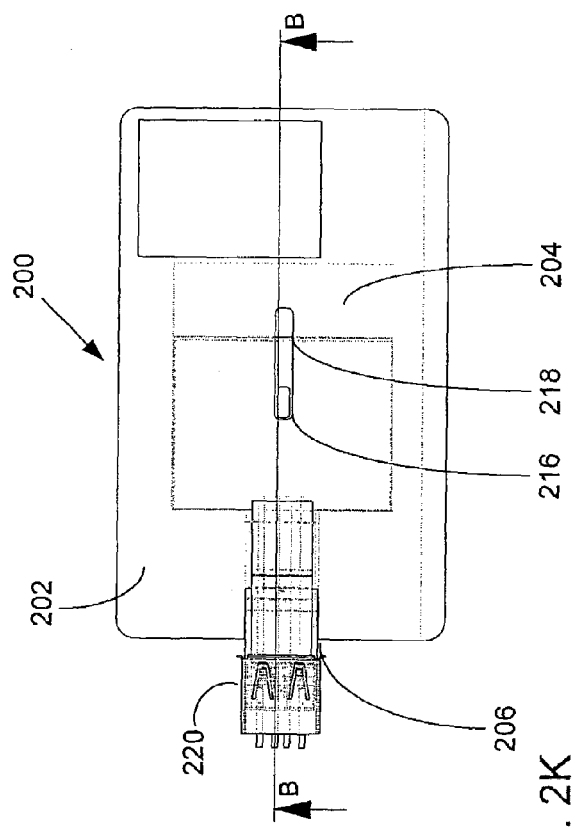
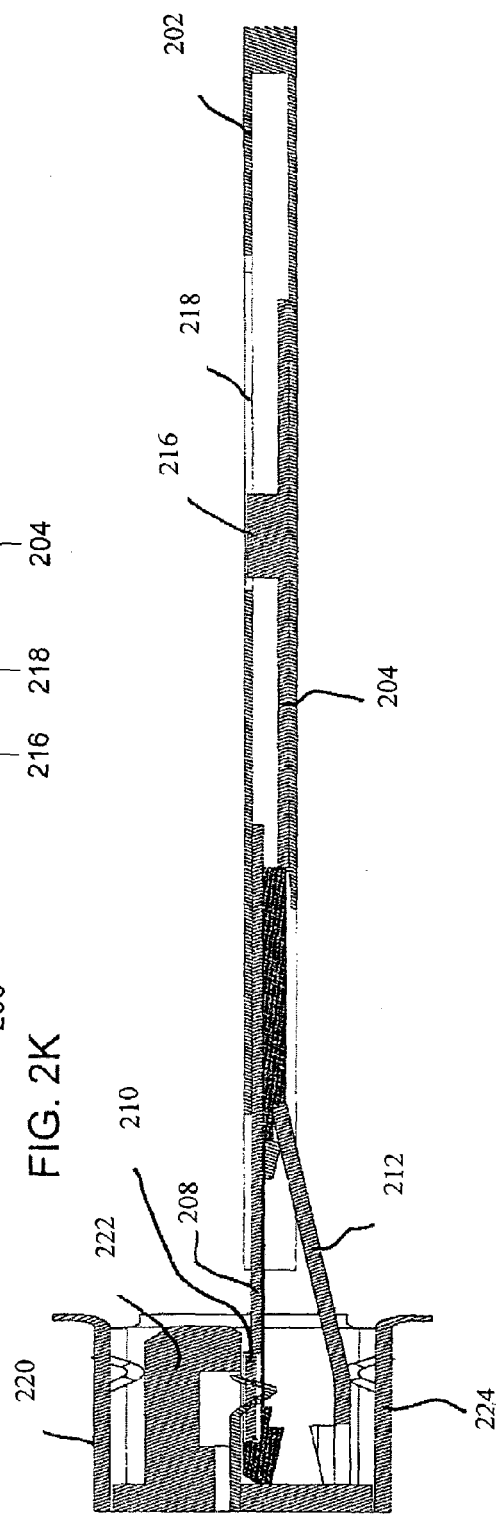
FIG. 2J
FIG. 2K

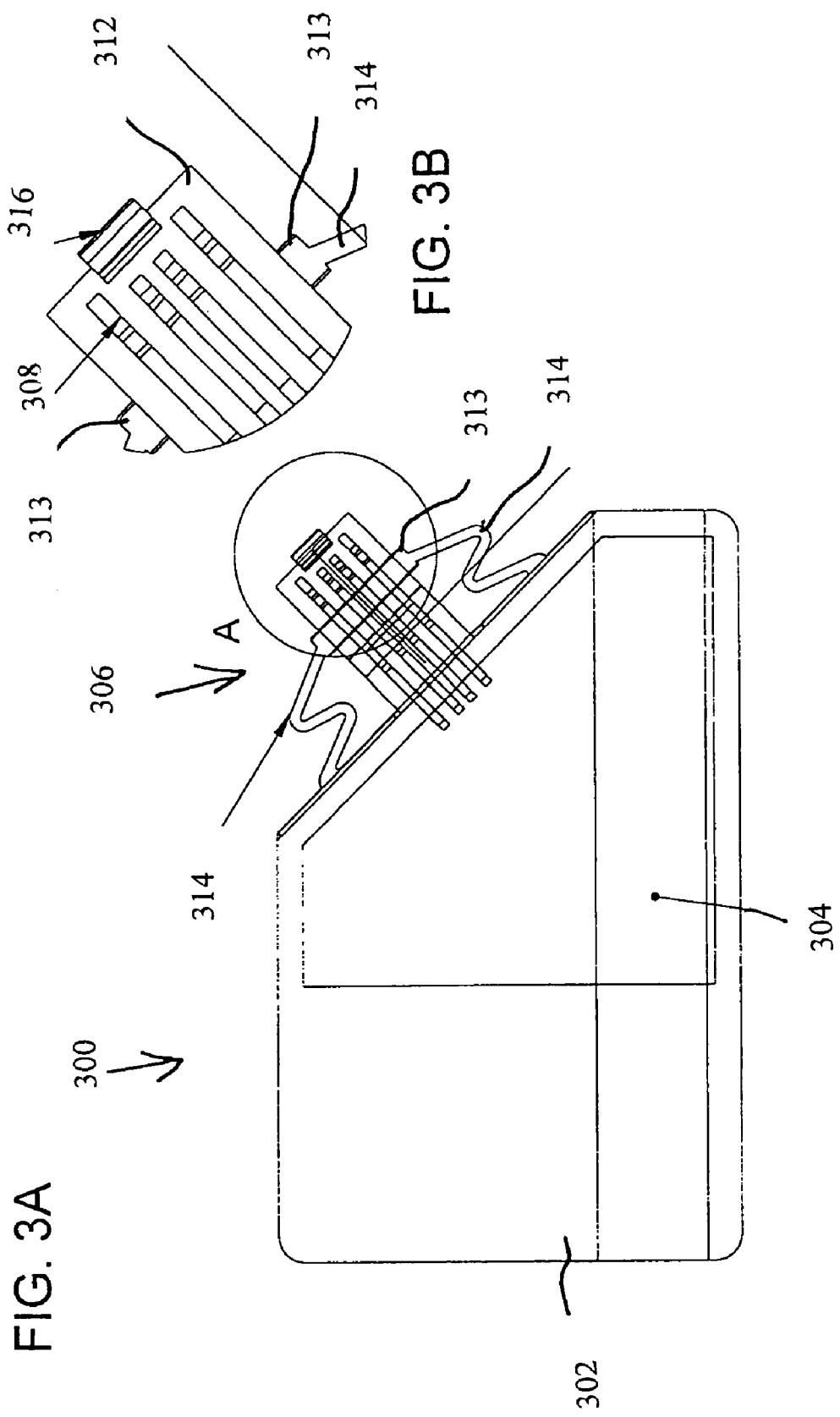

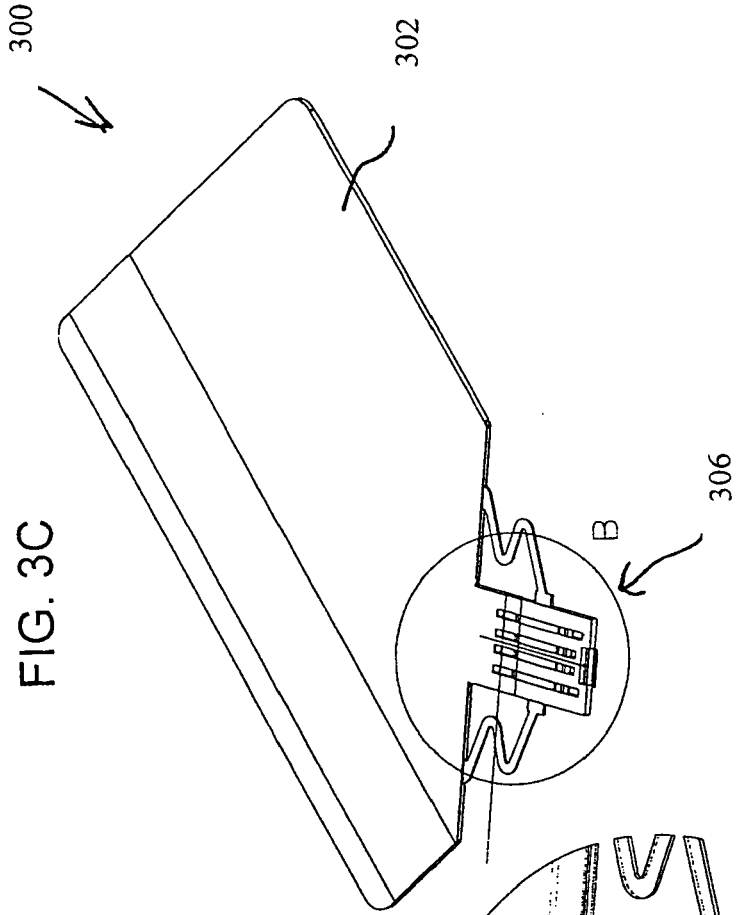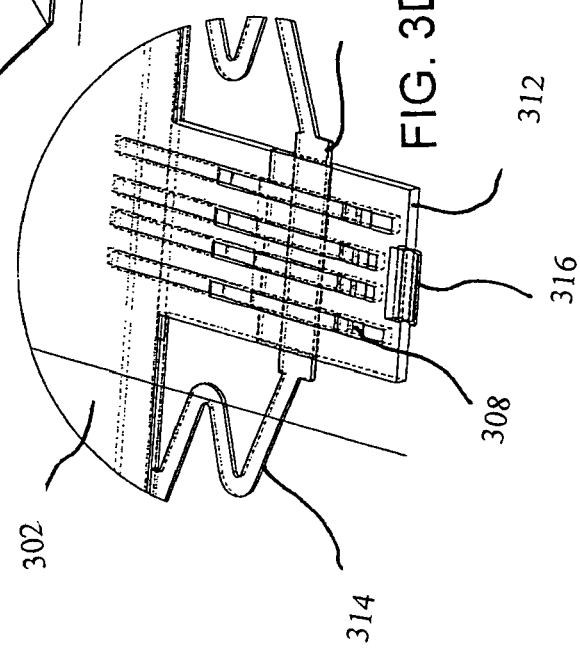

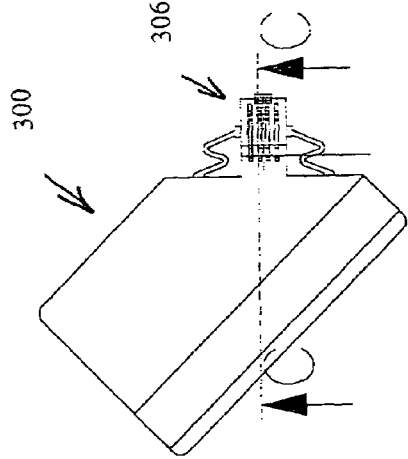
FIG. 3E
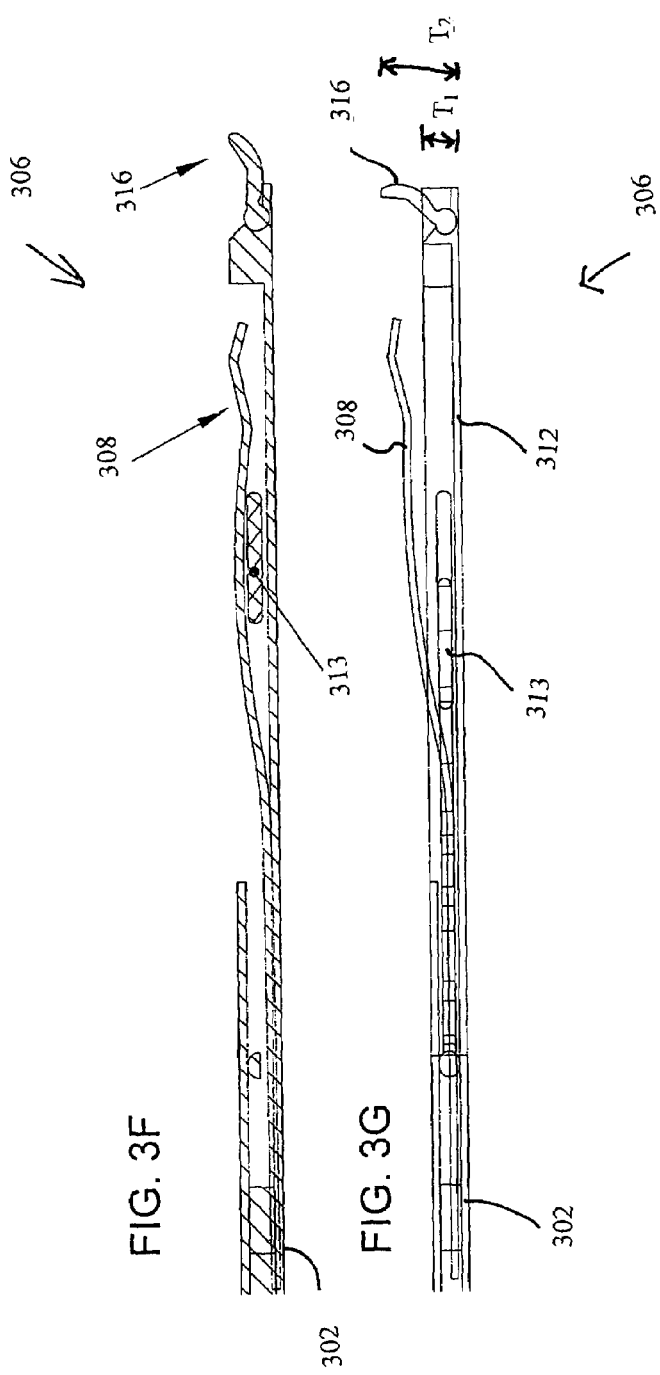
FIG. 3F
FIG. 3G

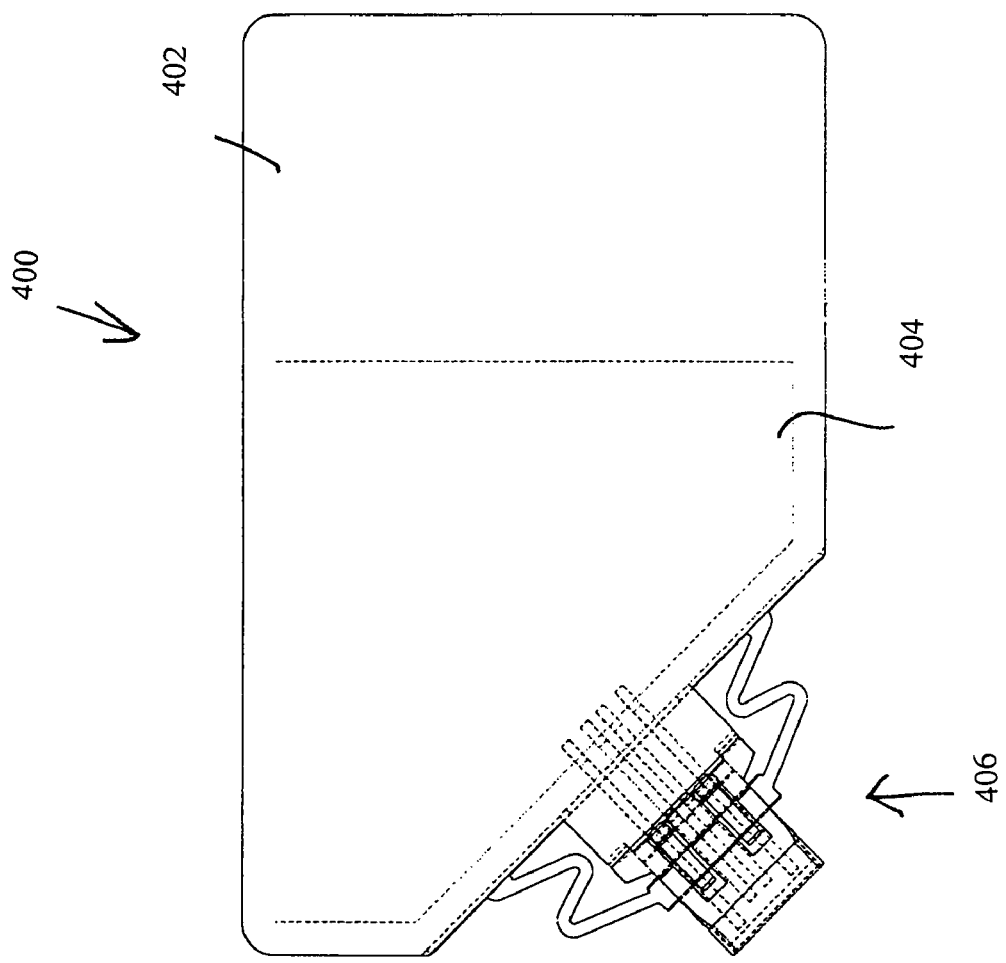

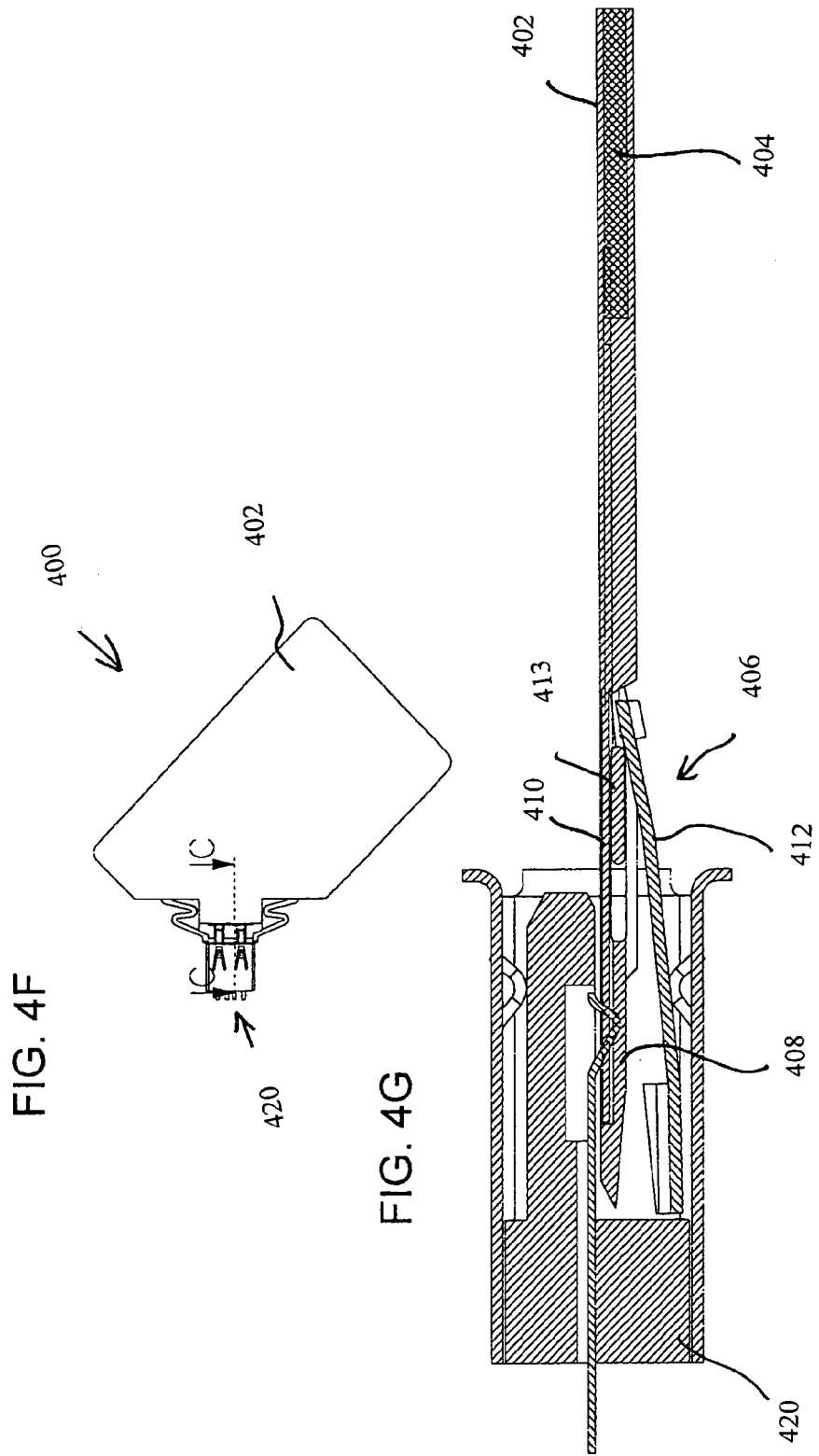

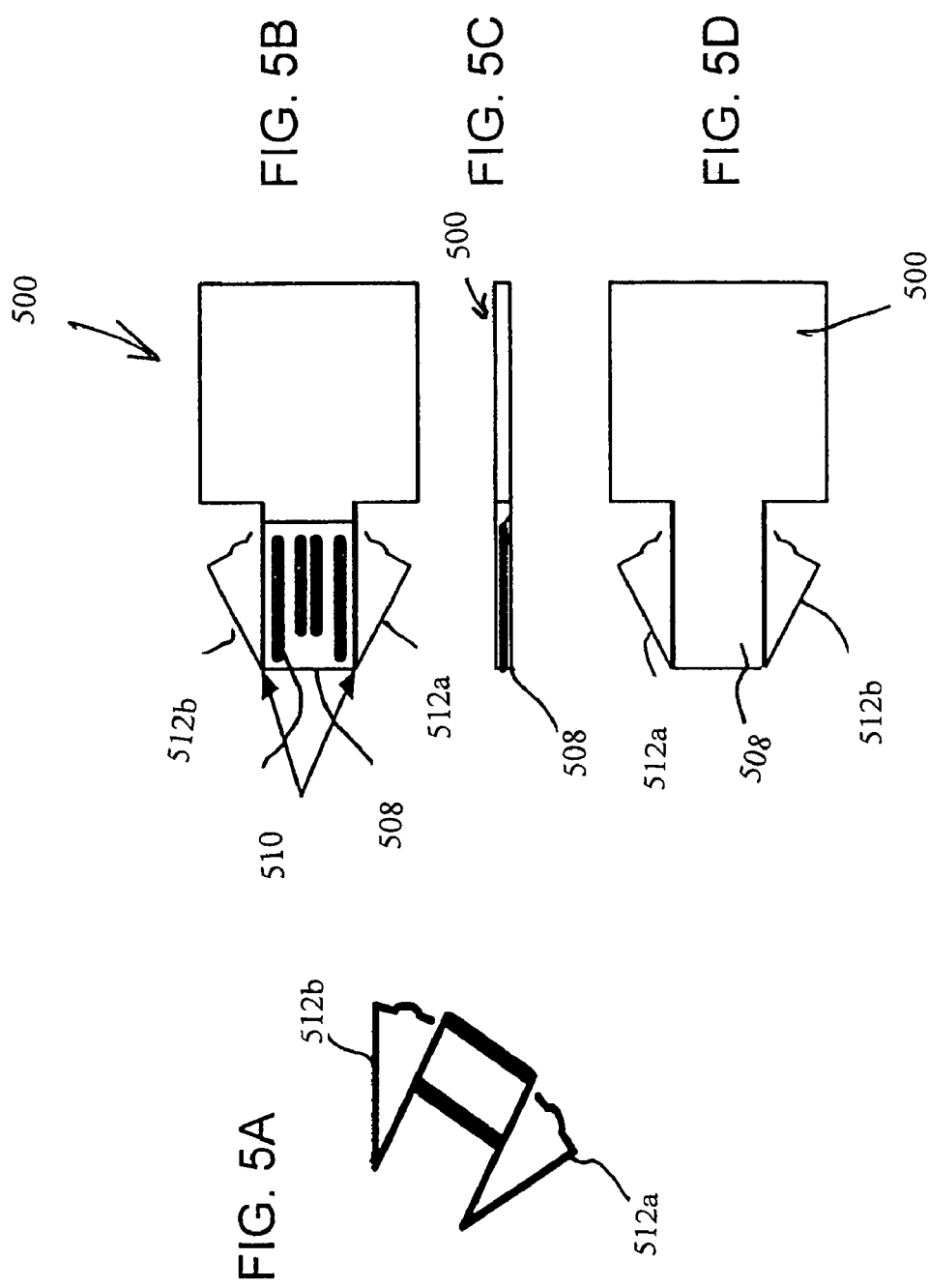

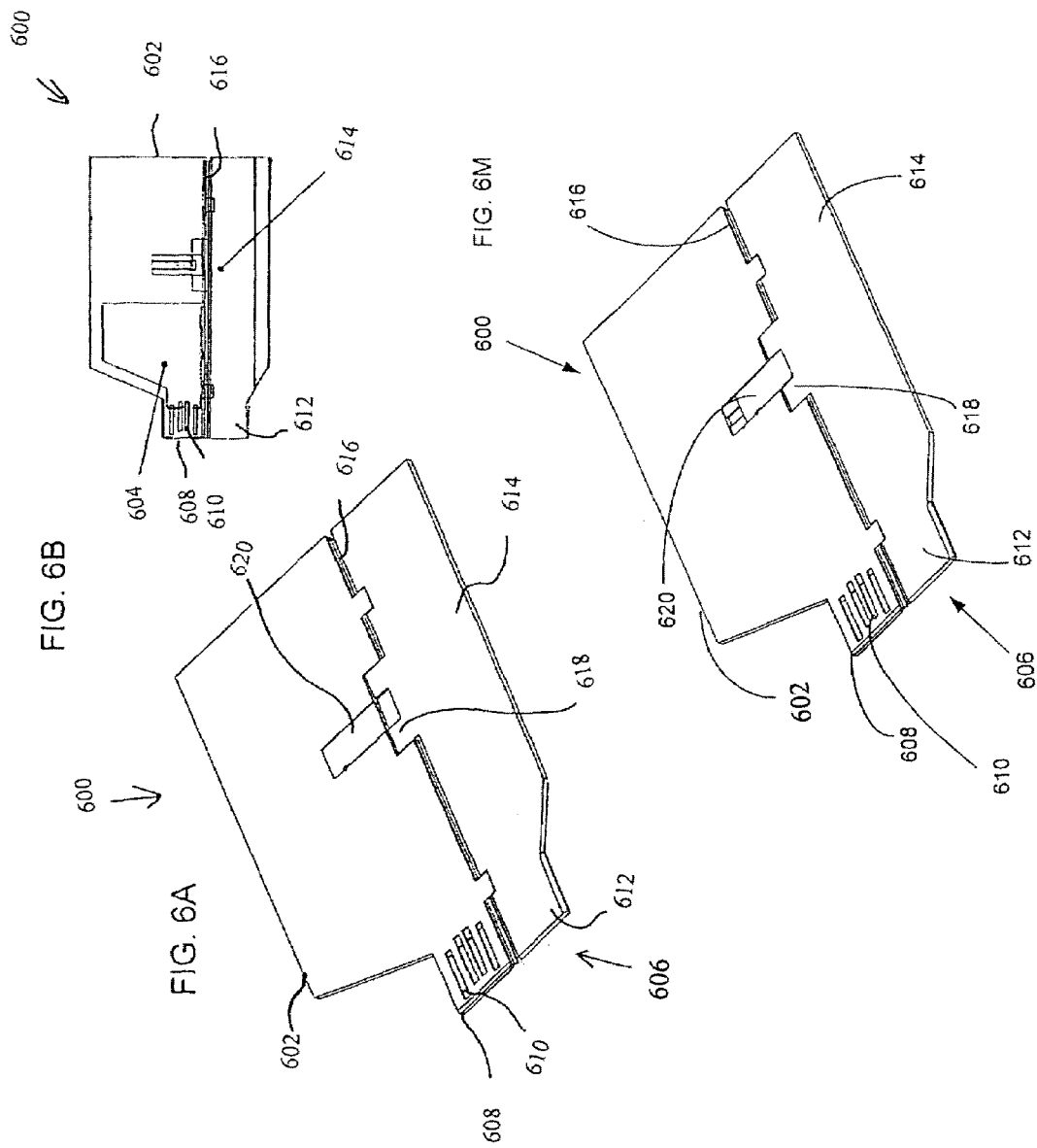

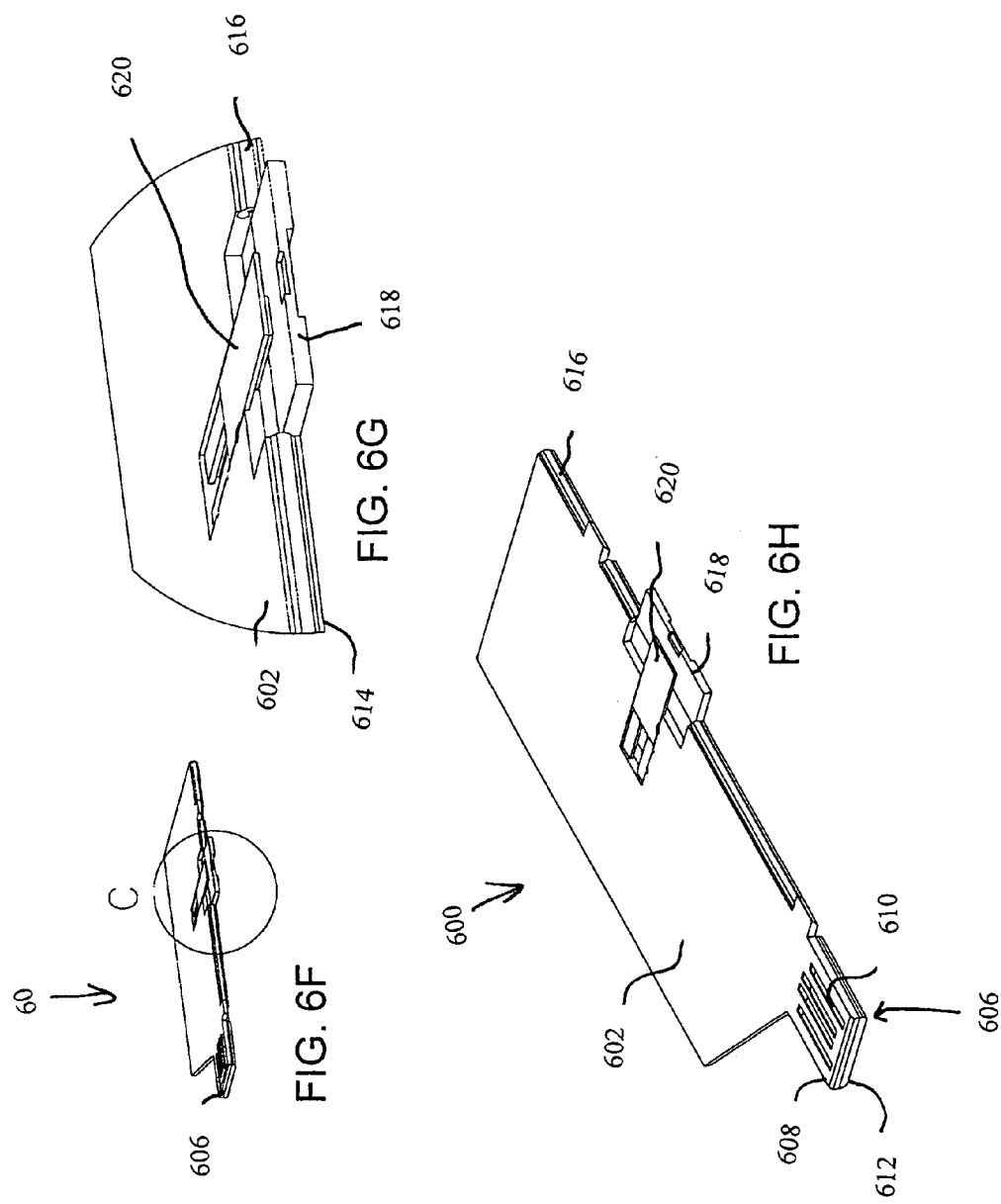

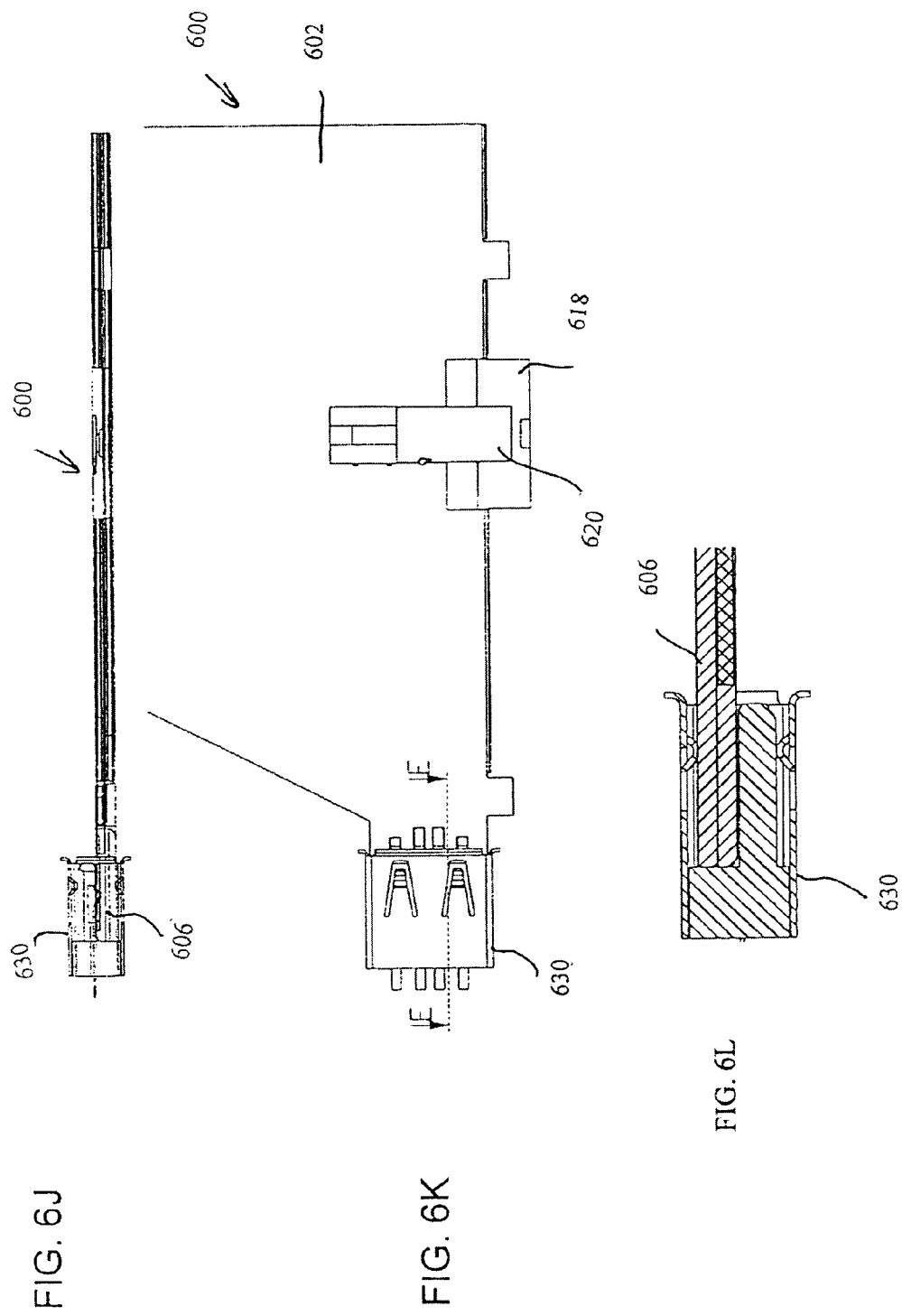

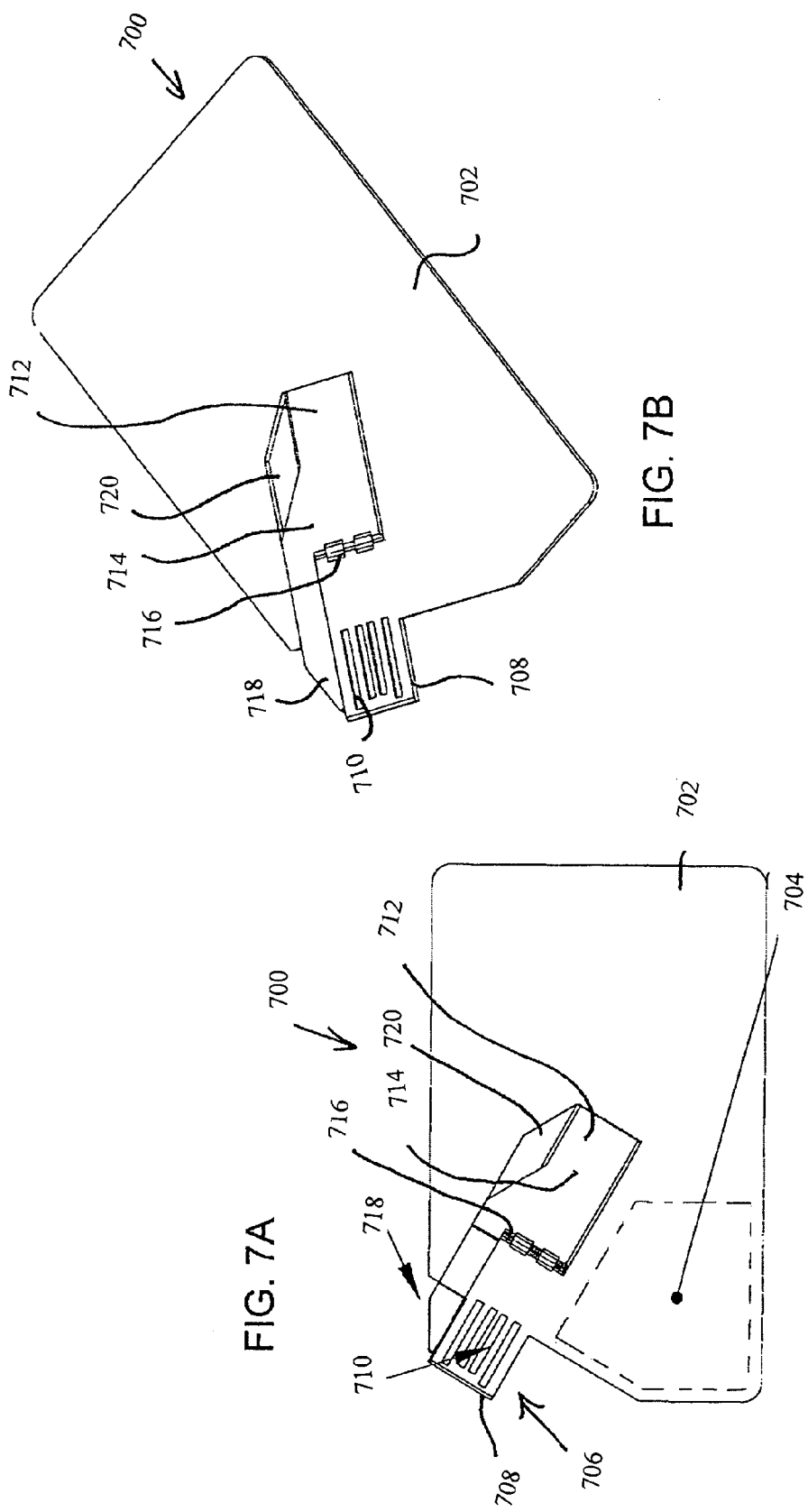

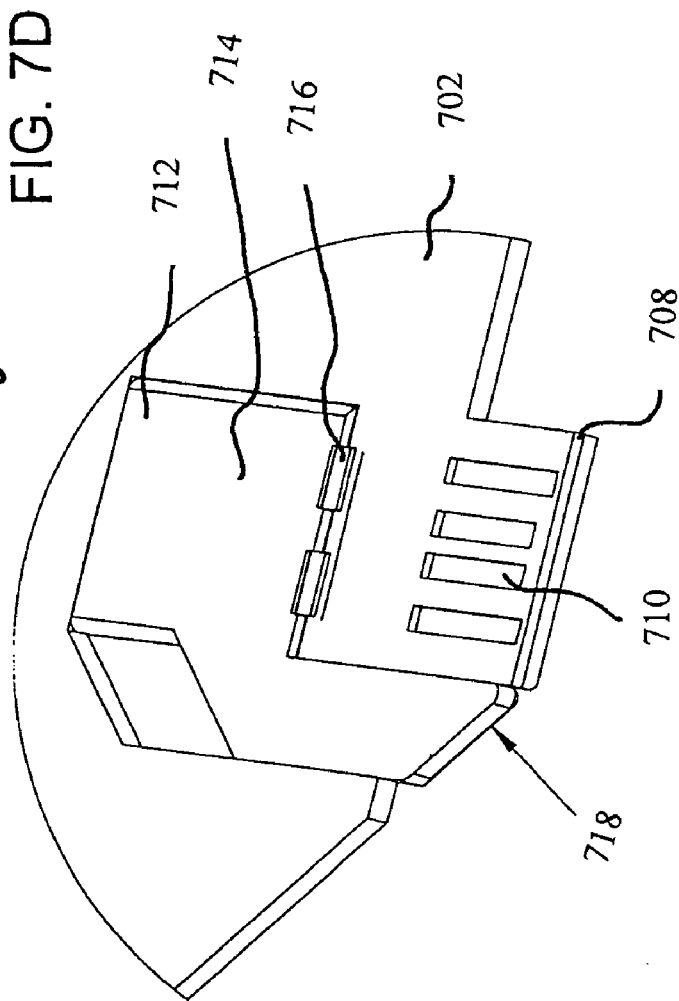
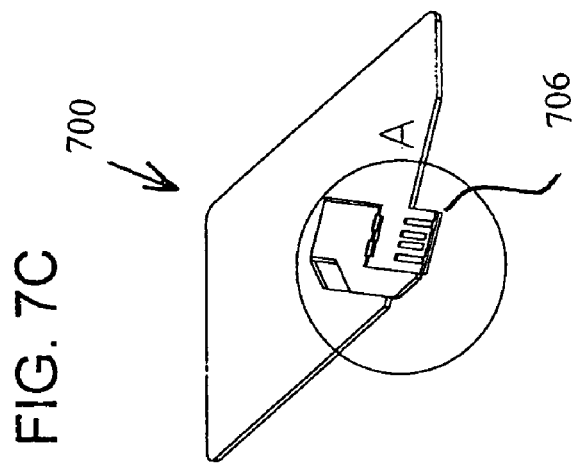

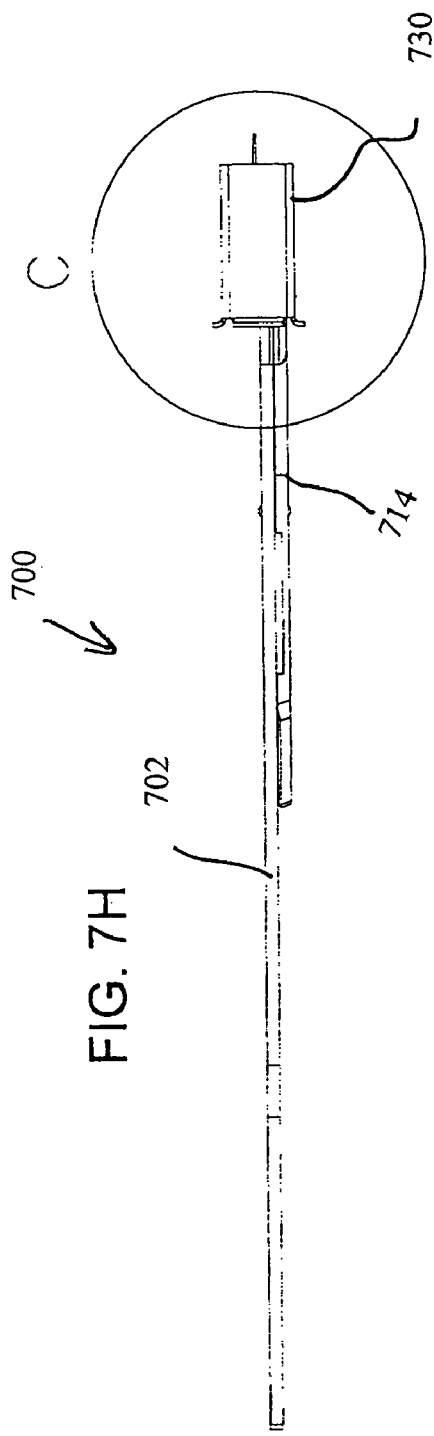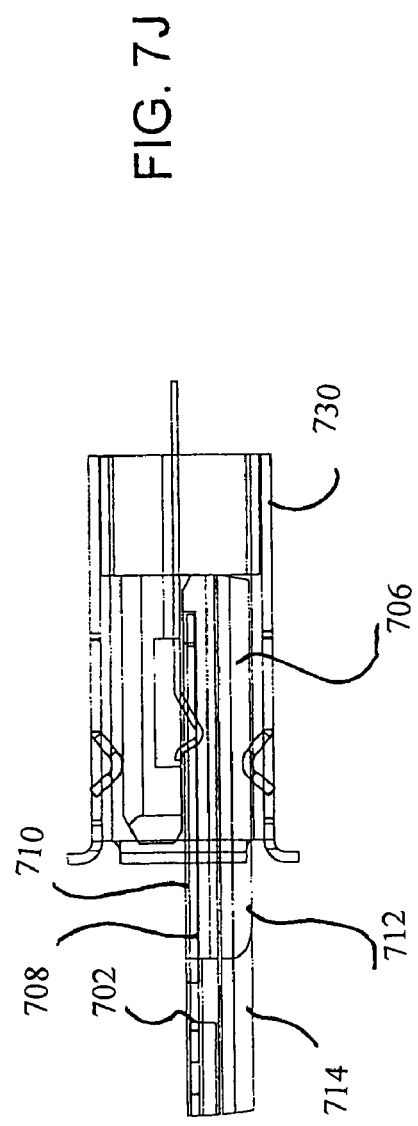
FIG. 7H
FIG. 7J

THIN PERIPHERAL FOR MATING WITH THICKER CONNECTOR

FIELD AND BACKGROUND OF THE INVENTION

The present invention relates to thin peripheral devices for connection to conventional connectors where the connector requires dimensions greater than those of the device itself.

USB connectors are defined under standards available from the USB Implementers Forum, Inc. Different connector types have been specified over the years: A, B, mini A, mini B, mini AB. Each type was devised for a specific market; A for the PC platform, B for peripheral devices and the mini type for hand held devices. As a result, USB peripherals for the PC market have always been configured to mate with the "USB A" receptacle form.

FIG. 8 shows a drawing of standard USB A-type plug taken from the aforementioned standard and illustrating the external dimensions of the plug in millimeters. The insertable portion of the plug is about 12 millimeters long, about 11 millimeters wide and about 4 millimeters high, defined by a rectangular metal casing of shielding. An inner insulating block carrying four contact strips is about 2 millimeters thick.

In order to mate with the standard USB A receptacle, existing peripheral devices typically use one of two options. A first option is to use a cable to connect between the device and the PC receptacle. The use of cables/adaptors, while seeming to solve many form factor problems, has gained a very low customer acceptance, since the need to carry an additional item (cable or plastic adaptor) in addition to the peripheral device itself is an unwelcome additional burden on the customer.

The alternative to a cable is an "embedded connector" where the connector is formed as part of the device itself. While this option is relatively straight forward for many peripheral devices, it is particularly problematic for thin peripheral devices, specifically where one of the dimensions of the device is designed to be smaller than all the dimensions of a conventional USB A plug, i.e., less than about 4 millimeters.

Thus, conventional approaches to designing thin USB-compatible peripheral devices have taken one of two approaches:

1. According to one approach, a device as thin as 3.9-4.5 mm is formed with a connector or captive cable of conventional USB A plug dimensions, meaning the device is as narrow as the height of a standard USB connector A-type plug. An example of such a device is commercially available under the name "USBCard Pro™" from Freecom Technologies, Inc. (Berkeley, Calif.).
2. A second approach provides a device as thin as low as 2 mm with an embedded connector, while removing the metal casing around the plug. In this case, the inner connector structure remains the same as a conventional USB A-type plug without the metal casing. Such a device is disclosed in U.S. Pat. No. 6,883,718. An example of such a device is commercially available under the name "Intelligent Stick" or "I-Stick" from PQI Corp. (Fremont, Calif.). If the thickness of the embedded connector is reduced below 2 mm, it would no longer wedge reliably into the recess of the socket and the electrical connections would become unreliable.

As a variant of this second approach, US Patent Application Publication No. 2004/0259423 A1 discloses selective application of resin to thicken specific regions, for example lateral ridges, of a thin dongle to the required 2 mm in order to provide reliable mechanical engagement with a standard USB socket.

Current card technology is capable of producing a wide range of devices of thickness less than 2 mm. Such devices are desirable for a range of applications including, but not limited to:

- memory cards for hand held devices, similar to the Secure Digital (SD) card, that are required to be as thin as possible;
- data storage devices that can be carried in a wallet;
- data storage devices or authentication and payment devices that need to comply with ISO standards, for example functioning as credit cards or the like.

The possibility of connecting such devices to a PC without the mediation of any external plug or connector would simplify many existing applications and facilitate many new applications or enhancements. It would therefore be advantageous to provide a memory storage device or other PCB-containing device with a thickness dimension less than 2 mm but which would maintain the capability of mating with a connector requiring dimensions of at least 2 mm, such as a standard USB A-type socket, thereby facilitating use of the device with a wide range of standard PC platforms.

SUMMARY OF THE INVENTION

The present invention is a thin peripheral device configured for mating with an electrical connector having a minimum engagement thickness which is greater than the thickness of the peripheral device itself.

The principle of the present invention is to employ a selectively deployable plug arrangement which lies within the profile of a thin peripheral device and is selectively deployable to temporarily provide a locally thicker portion functioning as an embedded connector for insertion into a complementary standard connector, such as a USB-A socket/receptacle. When the plug functionality is no longer required, the plug arrangement returns to an non-deployed state in which it lies within the thin profile of the device. The selective deployment of the plug arrangement is typically achieved by relative motion of two plug portions.

In a first set of implementations, the relative motion is a scissor-type opening of at least one element (typically, a flap) relative to the initial plane of the device. The opening action may be actuated by relative motion of the flap(s) over a lifting member (e.g., a wedge or bar) which raises them out of the plane of the device. The relative motion may be generated by a slide which advances the flaps relative to the device while the lifting member remains fixed. This causes one or both flaps to be raised. One of the flaps carries the electrical contacts, or is itself formed partially or entirely by the electrical contacts. In this case where a moving slide is used, the entire PCB within the peripheral device may optionally be slidable as a unit together with the flaps.

As a variant of this first set of implementations, the flap actuation may be achieved by a lifting member (e.g., a bar) which is moved, for example, by the action of insertion of the connector into a receptacle. In this case, one or more spring is preferably deployed to return the lifting member to its initial position after the device is disengaged from the receptacle. In a further variant, one or more spring element may itself provide the increase in thickness required for effective engagement of the connector socket without a moving flap.

The various plug configurations may be configured to engage a USB A-type receptacle exclusively in the area between the contact pads of the receptacle and the facing wall of the receptacle, or may alternatively or additionally use the opposite side of the receptacle, inserted in the narrower space between the non-pad (back) side of the receptacle block and the edge of the shielding sleeve which surrounds the receptacle.

In a second set of embodiments, the relative motion which provides the locally thicker portion functioning as an embedded connector is a hinged motion about an axis parallel to the plane of the device so as to fold two (or more) portions onto each other. This can take the form of a fold-axis traversing an entire dimension of the device so as to form a peripheral flap or a localized flap which is partially or entirely enclosed by the device. In either case, the folding portion is preferably lockable in at least one, and preferably both, of the unfolded, card-like state and the folded connector state.

Thus, according to the teachings of the present invention there is provided, a thin peripheral device for mating with an electrical connector having a minimum engagement thickness, the peripheral device comprising a body including electronic circuitry, the body further including a selectively deployable plug arrangement having: (a) a first plug portion including a plurality of electric contacts; and (b) a second plug portion, wherein at least part of the plug arrangement is selectively displaceable relative to a remainder of the body between a non-deployed configuration wherein the entire plug arrangement lies within a thickness dimension of the body that is less than the minimum engagement thickness of the electrical connector and a deployed configuration wherein the first and second plug portions together define an effective plug having a thickness that is at least the minimum engagement thickness of the electrical connector.

According to a further feature of the present invention, the thickness dimension of the body is less than 2 millimeters.

According to a further feature of the present invention, the body is configured in the non-deployed configuration as a card having a substantially uniform thickness less than 2 millimeters.

According to a further feature of the present invention, the effective plug is configured for mating with a standard USB A-type receptacle.

According to a further feature of the present invention, the effective plug is configured such that the first and second plug portions both engage within a hollow of the standard USB A-type receptacle between a contact block and an opposing portion of a shielding sleeve.

According to a further feature of the present invention, the effective plug is configured such that the first plug portion and the second plug portion engage opposite faces of a contact block of the standard USB A-type receptacle with the second plug portion inserted between a shielding sleeve and a reverse side of the contact block.

According to a further feature of the present invention, the electronic circuitry includes a memory storage device.

According to a further feature of the present invention, the memory storage device is comprised of a non-volatile memory unit having a capacity of at least 32 MB.

According to a further feature of the present invention, the first and second plug portions are at least partially overlapping in the non-deployed configuration, and wherein the deployed configuration is achieved by separating between at least part of the first and second plug portions.

According to a further feature of the present invention, the first and second plug portions are hingedly interconnected.

According to a further feature of the present invention, the electric contacts are deployed on a surface of the first plug portion facing towards the second plug portion.

According to a further feature of the present invention, a surface of the first plug portion facing away from the second plug portion is at least partially covered by electrical insulation.

According to a further feature of the present invention, the electric contacts are deployed on a surface of the first plug portion facing away from the second plug portion.

According to a further feature of the present invention, at least a surface of the second plug portion facing away from the first plug portion in the deployed configuration is at least partially formed from conductive electrical shielding.

According to a further feature of the present invention, the plug arrangement further includes a slide arrangement defining a sliding path of at least one of the first and second plug portions relative to the body such that, in the non-deployed configuration, the first and second plug portions lie within a periphery of the body, and such that, when the at least one of the first and second plug portions is advanced along the sliding path, the first and second plug portions form the deployed configuration defining an effective plug.

According to a further feature of the present invention, the plug arrangement further includes a lifting member associated with the body such that, when the first and second plug portions are advanced along the sliding path, the first and second plug portions pass over the lifting member, thereby separating the first and second plug portions to form the deployed configuration.

According to a further feature of the present invention, the electronic circuitry is implemented as part of a circuit layer mechanically associated so as to slide together with the first plug portion.

According to a further feature of the present invention, the plug arrangement further includes a slide actuator externally exposed for manual displacement by a finger of a user so as to displace the first and second plug portions along the sliding path.

According to a further feature of the present invention, the slide arrangement further includes a retention configuration for retaining the plug arrangement in at least one of the non-deployed configuration and the deployed configuration.

According to a further feature of the present invention, the plug arrangement further includes a displaceable lifting member selectively deployable between the first and second plug portions so as to separate the first and second plug portions from the non-deployed configuration to the deployed configuration.

According to a further feature of the present invention, there is also provided a lifting member actuator mechanically linked to the lifting member and configured such that, when the plug arrangement is inserted into a connector surrounded by a rim, abutment of the lifting member actuator against the rim causes deployment of the lifting member between the first and second plug portions.

According to a further feature of the present invention, the lifting member actuator is resiliently biased to a position which allows the first and second plug portions to return to the non-deployed configuration.

According to a further feature of the present invention, the second plug portion includes at least one spring element resiliently deformable so as to vary an effective thickness of the plug arrangement between the non-deployed configuration and the deployed configuration.

According to a further feature of the present invention, the at least one spring element is biased to assume the non-deployed configuration, and wherein the at least one spring element is configured such that insertion of the plug arrangement into the connector causes deformation of the spring element to assume the deployed configuration.

According to a further feature of the present invention, the first and second plug portions are substantially non-overlapping in the non-deployed configuration, and wherein the deployed configuration is achieved by folding at least one of the first and second plug portions about an effective hinge axis so that the first and second plug portions are brought into overlapping relation to form the effective plug.

According to a further feature of the present invention, the deployed configuration is achieved by folding one of the first and second plug portions through an angle of about 180° while the other of the first and second plug portions is not folded.

According to a further feature of the present invention, the body further includes a lock configuration selectively deployable to prevent folding of the plug portions about the effective hinge axis, thereby retaining the body in the non-deployed configuration.

According to a further feature of the present invention, the body further includes a lock configuration selectively deployable to retain the body in the deployed configuration.

According to a further feature of the present invention, the second plug portion is part of a peripheral flap connected by a hinge configuration extending along an external periphery of the body.

According to a further feature of the present invention, one of the first and second plug portions is implemented as a flap substantially surrounded by the body in the non-deployed configuration, the flap being rotatable about the effective hinge axis through an angle of about 180° so as to form the deployed configuration.

According to a further feature of the present invention, the second plug portion includes a plurality of electric contacts, the effective plug being configured as a reversible plug for coupling with a standard USB A-type receptacle such that: (a) in a first coupling orientation of the reversible plug with the receptacle, the electrical contacts of the first plug portion are mechanically connected with electrical contacts of the standard receptacle; and (b) in a second coupling orientation of the reversible plug with the receptacle, the electrical contacts of the second plug portion are mechanically connected with the electrical contacts of the standard receptacle.

There is also provided according to the teachings of the present invention, a thin peripheral device for mating with an electrical connector having a minimum engagement thickness, the peripheral device comprising a body including electronic circuitry, the body further including a selectively deployable plug arrangement having a plurality of electric contacts, wherein the plug arrangement is selectively deployable between a non-deployed configuration wherein the entire plug arrangement lies within a thickness dimension of the body that is less than the minimum engagement thickness of the electrical connector and a deployed configuration in which the plug arrangement forms an effective plug having a thickness that is at least the minimum engagement thickness of the electrical connector.

According to a further feature of the present invention, the electronic circuitry includes a memory storage device comprised of a non-volatile memory unit having a capacity of at least 32 MB.

There is also provided according to the teachings of the present invention, a thin storage device for mating with an electrical connector having a minimum engagement thickness, the storage device comprising a body including a memory unit having the capacity of at least 32 MB, the body further including a selectively deployable plug arrangement having: (a) a first plug portion including a plurality of electric contacts; and (b) a second plug portion, wherein at least part of the plug arrangement is selectively displaceable relative to a remainder of the body between a non-deployed configuration wherein the entire plug arrangement lies within a thickness dimension of the body that is less than the minimum engagement thickness of the electrical connector and a deployed configuration wherein the first and second plug portions together define an effective plug having a thickness that is at least the minimum engagement thickness of the electrical connector.

BRIEF DESCRIPTION OF THE DRAWINGS

The invention is herein described, by way of example only, with reference to the accompanying drawings, wherein:

FIG. 1A is a side view of a first embodiment of a thin peripheral device, constructed and operative according to the teachings of the present invention, for mating with an electrical connector having a minimum engagement thickness greater than a thickness of the device in its non-deployed configuration;

FIG. 1B is an enlarged view of a region of FIG. 1A designated by circle "A";

FIG. 1C is a plan view of the device of FIG. 1A;

FIG. 1D is an isometric view of the device of FIG. 1A with a plug arrangement in its non-deployed configuration;

FIG. 1E is an enlarged view of a region of FIG. 1D designated by circle "B";

FIG. 1F is an enlarged view of a region of FIG. 1D designated by circle "C";

FIG. 1G is an isometric view of the device of FIG. 1A with the plug arrangement in its deployed configuration;

FIG. 1H is an enlarged view of a region of FIG. 1G designated by circle "E";

FIG. 1J is an enlarged view of a region of FIG. 1D designated by circle "D";

FIG. 1K is a plan view of the device of FIG. 1A with the plug arrangement in its deployed configuration;

FIG. 1L is a side view of the device of FIG. 1A with the plug arrangement in its deployed configuration;

FIG. 1M is an enlargement of the region of FIG. 1N designated by circle "F";

FIG. 1N is a longitudinal cross-sectional view taken along the line designated G-G in FIG. 1K showing the plug arrangement mated with an electrical connector;

FIGS. 2B and 2C are upper and lower isometric views, respectively, showing the interconnection of a plug arrangement and a printed circuit board (PCB) from the device of FIG. 2A;

FIGS. 2D and 2E are plan views of the device of FIG. 2A with the plug arrangement in its non-deployed configuration and its deployed configuration, respectively;

FIG. 2F is a longitudinal cross-sectional view taken along the line designated A-A in FIG. 2D;

FIGS. 2G and 2H are enlarged cross-sectional views of the part of FIG. 2F including the plug arrangement shown in its non-deployed configuration and its deployed configuration, respectively;

FIG. 2J is a plan view similar to FIG. 2E showing the plug arrangement mated with an electrical connector;

FIG. 2K is a cross-sectional view similar to FIG. 2H showing the plug arrangement mated with an electrical connector;

FIG. 3A is a plan view of a third embodiment of a thin peripheral device, constructed and operative according to the teachings of the present invention, for mating with an electrical connector having a minimum engagement thickness greater than a thickness of the device in its non-deployed configuration;

FIG. 3B is an enlarged view of the region of FIG. 3A designated by circle "A";

FIG. 3C is an isometric view of the device of FIG. 3A;

FIG. 3D is an enlarged view of the region of FIG. 3C designated by circle "B";

FIG. 3E is a plan view of the device of FIG. 3A showing a line designated C-C;

FIGS. 3F and 3G are enlarged cross-sectional views taken through a plug arrangement of the device of FIG. 3E along line C-C, the plug arrangement being shown in its non-deployed configuration and its deployed configuration, respectively;

FIG. 4A is a plan view of a fourth embodiment of a thin peripheral device, constructed and operative according to the teachings of the present invention, for mating with an electrical connector having a minimum engagement thickness greater than a thickness of the device in its non-deployed configuration;

FIG. 4F is a plan view of the device of FIG. 4A mated with an electrical connector;

FIG. 4G is a cross-sectional view along the line designated C-C in FIG. 4F showing the plug arrangement mated with an electrical connector;

FIGS. 5A-5D are schematic isometric, top, side and bottom views, respectively, of a fifth embodiment of a thin peripheral device, constructed and operative according to the teachings of the present invention, for mating with an electrical connector having a minimum engagement thickness greater than a thickness of the device in its non-deployed configuration, the device being shown with a plug arrangement assuming its non-deployed configuration;

FIG. 6A is an isometric view of a sixth embodiment of a thin peripheral device, constructed and operative according to the teachings of the present invention, for mating with an electrical connector having a minimum engagement thickness greater than a thickness of the device in its non-deployed configuration;

FIG. 6B is a plan view of the device of FIG. 6A;

FIG. 6F is a first isometric view of the device of FIG. 6A in its fully folded state;

FIG. 6G is an enlarged view of a region of FIG. 6F designated by circle "C" illustrating deployment of a lock configuration;

FIG. 6H is a second isometric view of the device of FIG. 6A in its fully folded state;

FIGS. 6J and 6K are side and plan views, respectively, showing the device of FIG. 6F mated with an electrical connector;

FIG. 6L is a cross-sectional view taken along the line designated E-E in FIG. 6K;

FIG. 6M is a view similar to FIG. 6A showing the device locked in its flat state;

FIG. 7A is a plan view of a seventh embodiment of a thin peripheral device, constructed and operative according to the teachings of the present invention, for mating with an electrical connector having a minimum engagement thickness greater than a thickness of the device in its non-deployed configuration;

FIG. 7B is a first isometric view of the device of FIG. 7A;

FIG. 7C is a second isometric view of the device of FIG. 7A;

FIG. 7D is an enlarged view of the region of FIG. 7C designated by circle "A" showing a plug arrangement including a flap in its non-deployed configuration;

FIG. 7H is a side view showing the device of FIG. 7F mated with an electrical connector;

FIG. 7J is an enlarged view of the region of FIG. 7H designated by circle "C" but with part of the casing of the electrical connector removed for clarity.

DESCRIPTION OF THE PREFERRED EMBODIMENTS

Figure 1P:
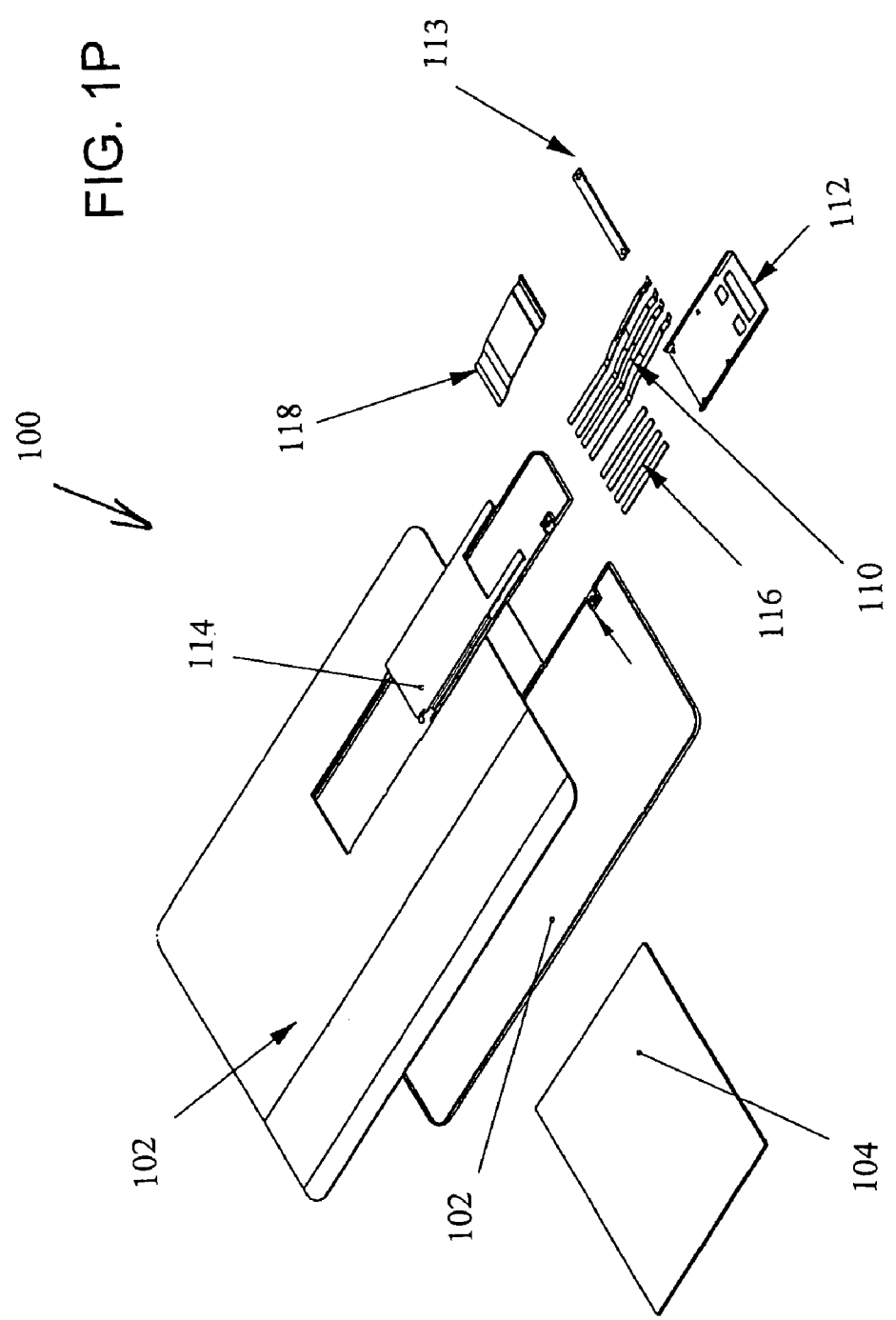
FIG. 1P is an isometric exploded view showing the main components of the device of FIG. 1A.
Figure 2A:
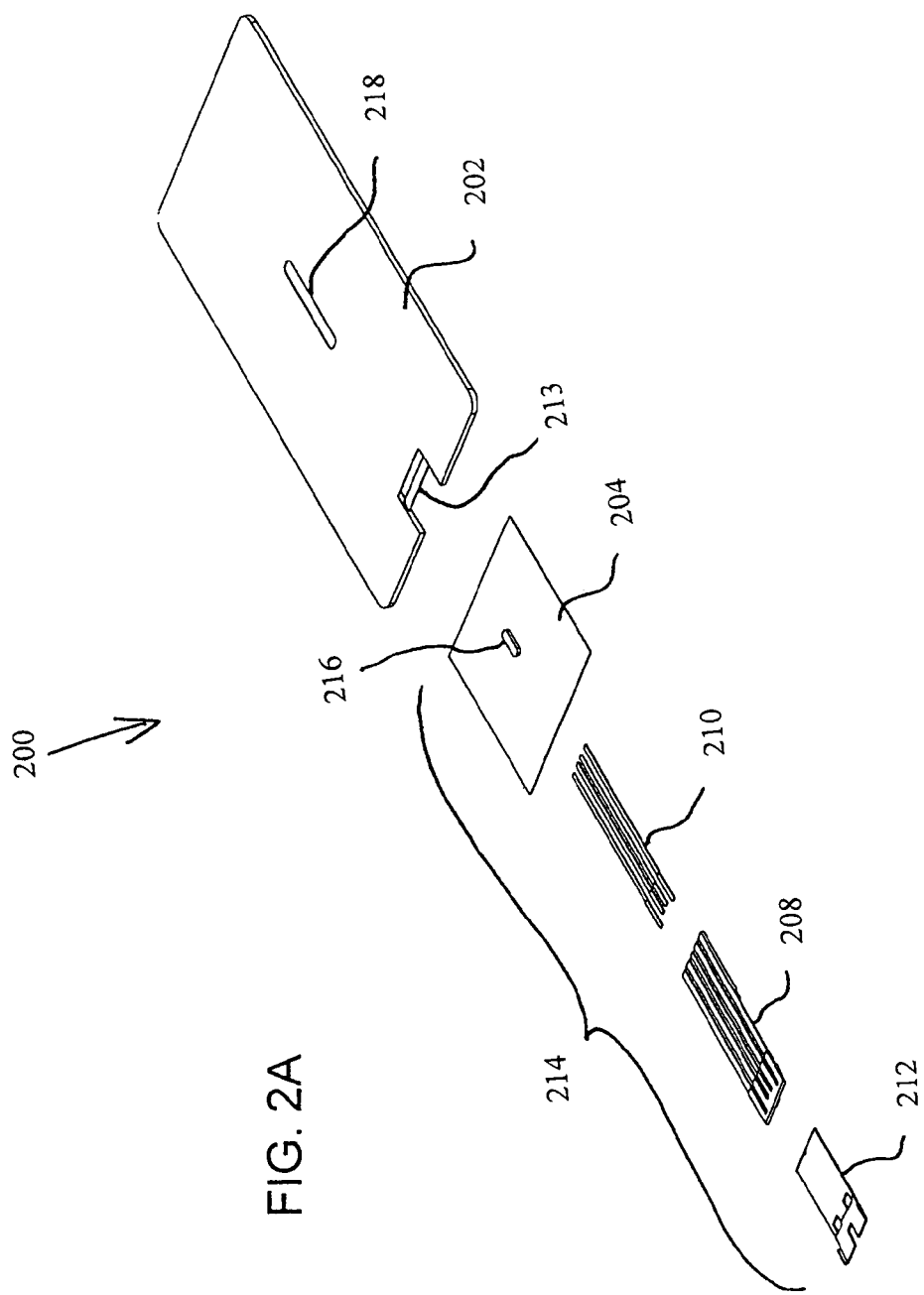
FIG. 2A is an isometric exploded view of a second embodiment of a thin peripheral device, constructed and operative according to the teachings of the present invention, for mating with an electrical connector having a minimum engagement thickness greater than a thickness of the device in its non-deployed configuration.

The present invention is a thin peripheral device for mating with an electrical connector having a minimum engagement thickness greater than a thickness of the device itself.

The principles and operation of devices according to the present invention may be better understood with reference to the drawings and the accompanying description.

By way of introduction, and in general terms, the present invention provides a thin peripheral device having a body including electronic circuitry. The device is "thin" in the sense that it has one dimension, referred to as the "thickness" of the device, which is smaller by at least an order of magnitude (factor of ten) than its other dimensions, giving the device a card-like profile. The invention particularly addresses situations where the thickness of the device is less than a minimum engagement thickness required for reliable engagement with a given electrical connector. In this context, "reliable engagement" is used to refer to mechanical engagement which confines relative movement of the connectors sufficiently to avoid sporadic disruption of the electrical connection under normal operating conditions. The "reliable engagement" is preferably sufficient to maintain electrical connection under conditions of slight vibration and the like, such as commonly occur during vehicular transportation. In the currently predominant example of a USB A-type receptacle, this minimum engagement thickness is at least 2 millimeters. The present invention provides a plug arrangement, integrated as part of the peripheral device within the aforementioned thickness limitations, which can be selectively deployed to form an effective plug having a "thickness" dimension greater than the initial thickness of the peripheral device, and configured to ensure effective engagement with the electrical connector.

In more structural terms, the body of the peripheral device includes a selectively deployable plug arrangement having a first plug portion carrying a plurality of electric contacts and a second plug portion. At least part of the plug arrangement is selectively displaceable relative to the remainder of the body between a non-deployed configuration and a deployed configuration. In the non-deployed configuration, the entire plug arrangement lies within a thickness dimension of the body less than the minimum engagement thickness of the electrical connector. In the deployed configuration, the first and second plug portions together define an effective plug having thickness greater than the thickness dimension of the body, and at least equal to the minimum engagement thickness, for mating with the electrical connector.

The broad scope of the present invention includes any and all mechanisms for displacing the plug portions between their non-deployed and deployed positions. The invention will be illustrated below with reference to a small number of preferred but non-limiting examples, which may be subdivided into families of implementations according to the mechanical principles of operation. In a first family of implementations, at least one plug portion is lifted outside the thickness of the non-deployed configuration profile by relative movement of the plug portion against a lifting member, typically a transverse bar. This family includes the implementations of FIGS. 1A-1P and 2A-2K in which the plug portions slide over a fixed bar, and the implementations of FIGS. 3A-3K and 4A-4G in which a lifting member moves relative to the body of the device to lift at least one of the plug portions. In a second family of implementations, exemplified by FIGS. 5A-5H, the required thickness increase is achieved by varying an extent of overlap between the plug portions and/or via elastic deformation of one or more of the plug portions themselves. In a third family of implementations, the required thickness increase is achieved by a folding motion which brings two parts of the device into overlapping relation. This family includes the implementation of FIGS. 6A-6L which employs a peripheral flap along one side of the device and the implementation of FIGS. 7A-7J in which a flap is an internal flap surrounded by the body of the device.

The various implementations of the invention all preferably have a thickness dimension, i.e., the maximum thickness of the device in its non-deployed configuration, which is less than 2 millimeters, and most preferably no more than about 1.5 millimeters, so as to comply with the dimensions of standard smart cards. It should be clearly appreciated that the maximum thickness referred to herein is typically the maximum height to which any part of the peripheral device would stand if placed on a flat surface, including all components of the plug arrangement in their non-deployed configuration. In most preferred implementations, the body is configured in the non-deployed configuration as a card having a substantially uniform thickness, i.e., that the thickness dimension does not vary abruptly, and lies within plus or minus 20 percent over substantially the entire area of the device. The resulting device may conveniently be carried within a credit card wallet or the like without becoming caught during insertion or removal of the device to and from the wallet. Nonetheless, despite the substantially uniform low thickness of the device of the present invention, the deployed configuration of the plug arrangement provides reliable electrical connectivity to an electrical connector, most preferably a standard USB A-type receptacle, without requiring any supplementary lead or adapter.

The present invention may be implemented in the context of a wide range of peripheral devices. In one particularly preferred set of non-limiting examples, the device includes a memory storage device. For example, the device may be a mass data storage device, SD data card, smart card, or any other miniature device such as an MP3 recorder or camera. The device of the invention may be either a device which functions primarily through connection to a USB or similar connector, or may alternatively be a device with one or more additional interfaces (such as surface contacts) for its primary functionality, where the USB connectivity provides additional secondary functionality.

Referring now to the drawings, the first family of implementations mentioned above include the devices illustrated in FIGS. 1A-1P, 2A-2K, 3A-3K and 4A-4G. In each of these implementations, the aforementioned first and second plug portions are at least partially overlapping in the non-deployed configuration, and the deployed configuration is achieved by separating between at least part of the first and second plug portions.

Turning now specifically to FIGS. 1A-1P, this illustrates a first embodiment of a thin peripheral device, generally designated 100, constructed and operative according to the teachings of the present invention. Device 100 has a body 102 including electronic circuitry, typically formed on a circuit layer such as a printed circuit board ("PCB") 104 (FIGS. 1K, 1N and 1P). "Electronic circuitry" may include any number of modules, a non-limiting example of such a module may be a non-volatile memory module of 32 MB and above. Parenthetically, it should be noted that the "electronic circuitry" of the present invention is represented schematically in the drawings as a sheet or layer without showing any specific electronic components for clarity of presentation. Technology for producing PCBs sandwiched within housings of thickness less than 2 millimeters is well known in the art, and is used commercially in devices such as SD memory cards. Device 100 also includes a selectively deployable plug arrangement 106 having a first plug portion 108 carrying a plurality of electric contacts 110 and a second plug portion 112. As mentioned above, at least part of the plug arrangement is selectively displaceable relative to the remainder of the body between a non-deployed configuration and a deployed configuration. In this case, both first and second plug portions 108, 112 are slidably mounted relative to body 102 so as to be manually advanceable from the non-deployed configuration of FIGS. 1C, 1D and 1F to the deployed configuration of FIGS. 1G, 1J and 1K, and subsequently retracted. As the plug portions advance, first plug portion 108 passes over a fixed bar 113 arranged so as to lift plug portion 108 as a flap projecting above the initial upper surface of the device. The resulting effective plug structure has a dimension measured in the thickness direction of the device of $T_2$ as shown in FIG. 1M, in contrast to the smaller initial thickness of the device $T_1$.

In the particular example of device 100, plug arrangement 106 is implemented with a slide arrangement defining a sliding path of first and second plug portions 108, 112 relative to body 102 such that, in the non-deployed configuration, the first and second plug portions lie within a periphery of the body as shown in FIG. 1D, and such that, when the first and second plug portions are advanced along the sliding path, the first and second plug portions form the deployed configuration defining an effective plug projecting outside the periphery as shown in FIG. 1G. The use of a sliding plug arrangement which retracts within rectangular periphery of the body when not in use allows device 100 to be formed with a conventional rectangular card profile.

Structurally, as best seen in FIG. 1P, the slide arrangement is here implemented with a slide 114 mounted within a corresponding slot formed in body 102. Sliding engagement may be achieved by forming slide 114 with lateral ridges which engage between the upper and lower surfaces of body 102 along the edges of the slot. Slide 114 also serves as a structural support for the other components of plug arrangement 106. To maintain electrical contact between the fixed PCB and the contacts 110 of the sliding plug arrangement, the contacts 110 are preferably formed as elongated strip contacts which slide along in contact with a corresponding set of contact strips 116 (FIG. 1P) which are connected to PCB 104.

Displacement of the plug arrangement between its non-deployed and deployed configurations is typically performed manually using slide 114 as a manually operated actuator. Specifically, a user grips slide 114 between a finger and thumb and displaces the slide in the required direction relative to the body 102 of the device. In order to avoid unintentional displacement of slide 114, the slide arrangement preferably further includes a retention configuration for retaining the plug arrangement in at least one, and preferably both, of the non-deployed configuration and the deployed configuration. This may be achieved very simply by forming slide 114 with a resilient projecting tab 117 which engages corresponding recesses formed along the sides of the slot in body 102, as shown in FIGS. 1E and 1H.

It will be noted that the relative movement during separation of first and second plug portions 108 and 112 to form the deployed configuration of FIGS. 1J and 1M is that of hingedly interconnected flaps. Specifically, second plug portion 112 here remains substantially rigid while first plug portion 108 moves upwards in a hinged motion. In the particularly preferred implementation illustrated here, the effective hinge is provided by flexibility of the strips making up contacts 110 at or near the junction between slide 114 and a reinforcing insulating layer 118 which overlies and structurally unites the contacts 110. Parenthetically, it should be noted that this embodiment exemplifies an implementation option through which contacts 110 may provide a significant, or even exclusive, structural component of first plug portion 112. Clearly, alternative hinge structures can be implemented within the capabilities of one ordinarily skilled in the art.

As mentioned above, the lifting member which separates plug portions 108 and 112 as they advance in this embodiment is a fixed bar 113. The mounting position of bar 113 traversing the slot of body 102 is best seen in FIG. 1P.

It will be noted that electrical contacts 110 of this embodiment are deployed on a surface of first plug portion 108 facing towards second plug portion 112, while the rear surface of first plug portion 110, i.e., the side facing away from second plug portion 112, is rendered electrically insulating by use of reinforcing insulating layer 118. This arrangement of inward-facing electrical contacts is particularly suited to a form of engagement with an electrical connector 120 as illustrated in FIG. 1N where second plug portion 112 is inserted between the inner contact block 122 of the connector and its outer shielding 124 so as to securely engage device 100 in connector 120 while first plug portion 108 in its raised position passes on the other side of the contact block 122 so as to come into electrical contact with the contacts of the socket. Thus, the plug arrangement effectively clips on to the contact block within the connector. The insulation on the rear surface of first plug portion 110 serves to prevent accidental electrical shorting of the contacts against the conductive shielding of the connector facing the contacts of the contact block.

Referring back to FIGS. 1B, 1F and 1J, it will be noted that second plug portion 112 is here formed with turned up edges which take up a majority of the non-deployed configuration thickness of device 100, while first plug portion 108 is made somewhat narrower than second plug portion 112 so that the first plug portion effectively sits within the trough of second plug portion 112 in the non-deployed configuration. The turned up edges are preferably formed with a channel in order to accommodate transverse fixed bar 113. These turned up edges of second plug portion 112 follow the shape of the channel between contact block 122 and outer shielding 124 of connector 120, thereby stabilizing device 100 against misalignment and providing frictional engagement when the device is mated with the electrical connector 120. Positive engagement of the device within the connector can be achieved by providing recesses 126 (FIG. 1J) into which the standard springs of electrical connector 120 become lodged when second plug portion 112 is fully inserted. Most preferably, second plug portion 112 is an electrically conductive element electrically connected to a ground connection of the PCB 104, thereby ensuring that the PCB and the host device share a common ground connection.

Turning now to FIGS. 2A-2K, there is shown a second embodiment of a thin peripheral device, generally designated 200, constructed and operative according to the teachings of the present invention. Device 200 is similar in structure and operation to device 100 described above, differing primarily in the implementation of the slide arrangement and details of the plug arrangement.

Thus, device 200 has a body 202 including a PCB 204. Device 200 also includes a selectively deployable plug arrangement 206 having a first plug portion 208 carrying a plurality of electric contacts 210 and a second plug portion 212. As in device 100 described above, both first and second plug portions 208, 212 are slidably mounted relative to body 202 so as to be manually advanceable from the non-deployed configuration of FIGS. 2D and 2G to the deployed configuration of FIGS. 2E and 2H, and subsequently retracted. As the plug portions advance, second plug portion 212 passes under a fixed bar 213 arranged so as to deflect plug portion 212 downwards as a flap projecting below the initial upper surface of the device. The resulting effective plug structure has a dimension measured in the thickness direction of the device of $T_2$ as shown in FIG. 2H, in contrast to the smaller initial thickness of the device $T_1$.

As in the previous embodiment, plug arrangement 206 is implemented with a slide arrangement defining a sliding path of first and second plug portions 208, 212 relative to body 202 such that, in the non-deployed configuration, the first and second plug portions lie within a periphery of the body as shown in FIG. 2D, and such that, when the first and second plug portions are advanced along the sliding path, the first and second plug portions form the deployed configuration defining an effective plug projecting outside the periphery as shown in FIG. 2E, allowing device 200 to be formed with a conventional rectangular card profile.

Structurally, the slide arrangement of device 200 differs considerably from that of device 100 described above. Specifically, the electronic circuitry of this embodiment is implemented as part of a circuit layer (PCB 204) mechanically associated so as to slide together with first plug portion 208. In this case, PCB 204 forms an integral part of a slide assembly 214 shown in FIGS. 2B and 2C, the entirety of which moves during deployment of the plug arrangement from its non-deployed configuration to it deployed configuration. Since PCB 204 slides within body 202 during deployment of the plug arrangement, electrical contacts 210 can be connected to the PCB by standard techniques, or even formed as part of the printed circuit itself, thereby avoiding complexity of assembly and any reliability issues associated with the sliding contacts of the previous embodiment.

In order to maintain alignment of slide assembly 214, PCB 204 is preferably provided with at least one a projection 216 which engages a corresponding slot 218 formed in the upper and/or lower surface of body 202. By providing either two projections, or by forming projection 216 as a projecting ridge as shown, engagement with slot 218 maintains alignment of the PCB while allowing sliding motion parallel to the slot. Most preferably, at least one projection 216 is formed with a height sufficient to project outwards slightly from the upper surface of body 102, serving as a manually-operable actuator for manual displacement of the slide assembly between its non-deployed and deployed configurations.

Another respect in which device 200 differs from device 100 is the configuration of the deployed plug arrangement. Specifically, in this case, electric contacts 210 are deployed on a surface of first plug portion 208 facing away from second plug portion 212. This configuration is thus suited to insertion into the major hollow of a conventional USB A-type electrical connector (receptacle) 220, i.e., the space between the contacts of the inner contact block 222 and the facing part of the outer shielding 224, as shown in FIG. 2K. In this case, second plug portion 212, or at least its outward facing surface, is preferably implemented with conductive electrical shielding.

In all other respects, the structure and function of device 200 is similar to that of device 100 described above, and can be fully understood by analogy to that description.

It should also be noted that the various features described in the context of the different embodiments of the invention should be understood, wherever possible, to be interchangeable. Thus, for example, the sliding PCB embodiment of FIG. 2A may optionally be implemented with the plug arrangement 106 of FIG. 1A.

Parenthetically it should be noted that, although described here in the context of embodiments where both plug portions slide, alternative implementations (not shown) may be implemented in which a first plug portion is fixed and the second plug portion is raised as it undergoes a sliding motion.

Turning now to the embodiments of FIGS. 3A-3K and 4A-4G, these are conceptually similar to the embodiments described above, but employ a displaceable lifting member selectively deployable between the first and second plug portions so as to separate the first and second plug portions from the non-deployed configuration to the deployed configuration. As a result, the transformation from the non-deployed configuration to the deployed configuration of the plug arrangement occurs without displacement of the plug arrangement in the plane of the device.

Figure 3H:
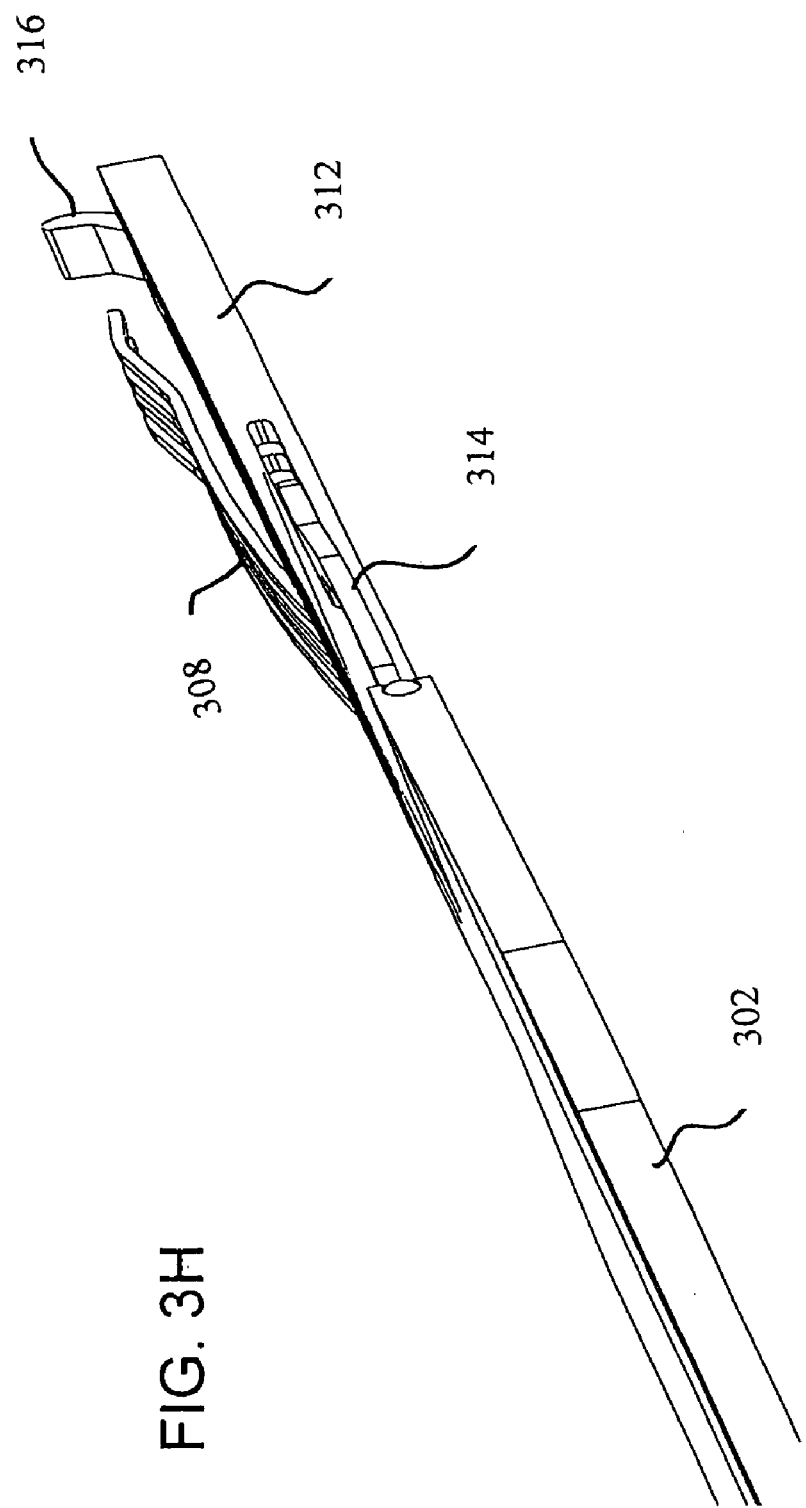
FIG. 3H is a first isometric view of the deployed configuration of the plug arrangement of FIG. 3G.
Figure 3J:
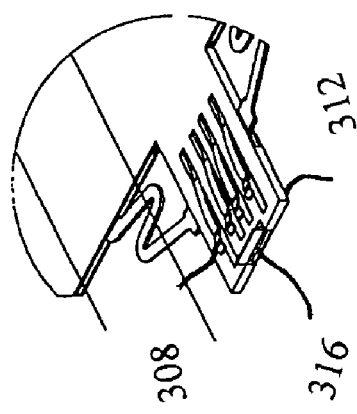
FIG. 3J is a second isometric view of the deployed configuration of the plug arrangement of FIG. 3G.

Referring specifically to FIGS. 3A-3K, these show a third embodiment of a thin peripheral device, generally designated 300, constructed and operative according to the teachings of the present invention. Device 300 has a body 302 including a PCB 304. Device 300 also includes a selectively deployable plug arrangement 306 having a first plug portion 308 implemented as a plurality of electric contacts and a second plug portion 312. Unlike the sliding plug portions of the previous embodiments, plug portions 308 and 312 are in this case mounted in fixed relation to body 302. Separation of the plug portions to form the deployed state of the plug arrangement is achieved by displacement of a lifting member 313 which underlies electrical contacts 308 and lifts them as it moves from the non-deployed configuration of FIG. 3F to a raised, deployed configuration as shown in FIGS. 3G, 3H and 3J. The resulting effective plug structure has a dimension measured in the thickness direction of the device of $T_2$ as shown in FIG. 3G, in contrast to the smaller initial thickness of the device $T_1$.

In the particularly preferred implementation illustrated here, end portions of lifting member 313 serve as actuators configured such that, when plug arrangement 306 is inserted into a connector 320 surrounded by a rim 324 (FIG. 3K), abutment of the end portions of lifting member 313 against rim 324 causes displacement of lifting member 313 relative to body 302, thereby deploying the plug arrangement. Lifting member 313 (and its actuating end portions) is preferably supported by a resilient mounting arrangement, exemplified here by spring elements 314, which resiliently bias the lifting member to a position which allows electrical contacts 308 to return resiliently to their non-deployed configuration. As a result, the resilient properties of spring elements 314 and of contacts 308 themselves ensure that the plug arrangement returns to its compact non-deployed configuration when removed from the connector.

Figure 3K:
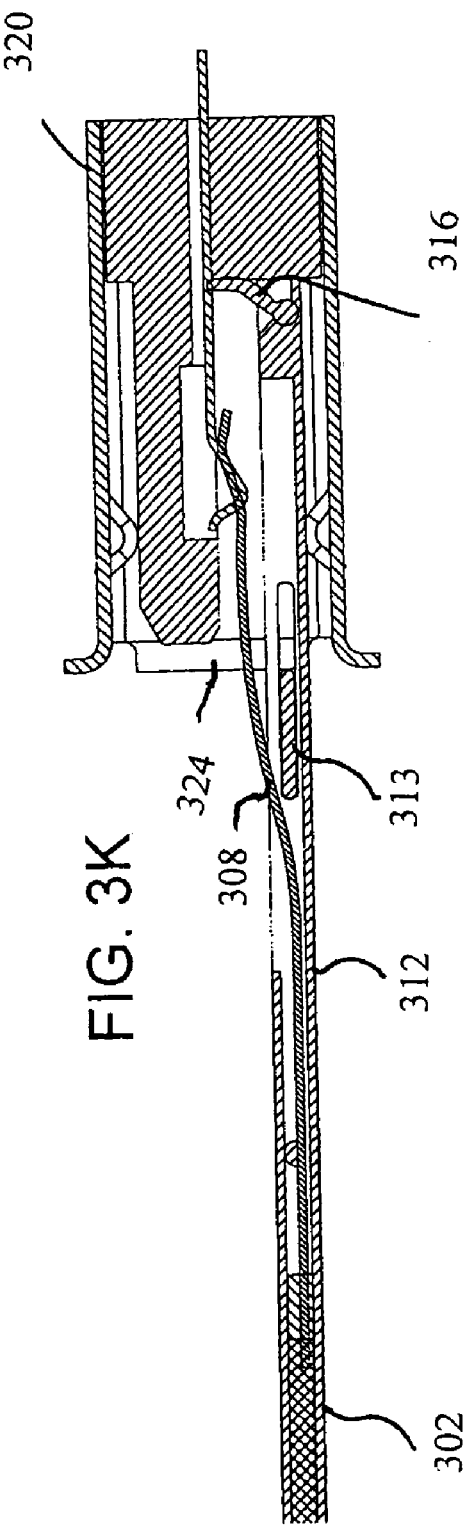
FIG. 3K is an enlarged cross-sectional view showing the plug arrangement of the device of FIG. 3G mated with an electrical connector.
Figure 4B:
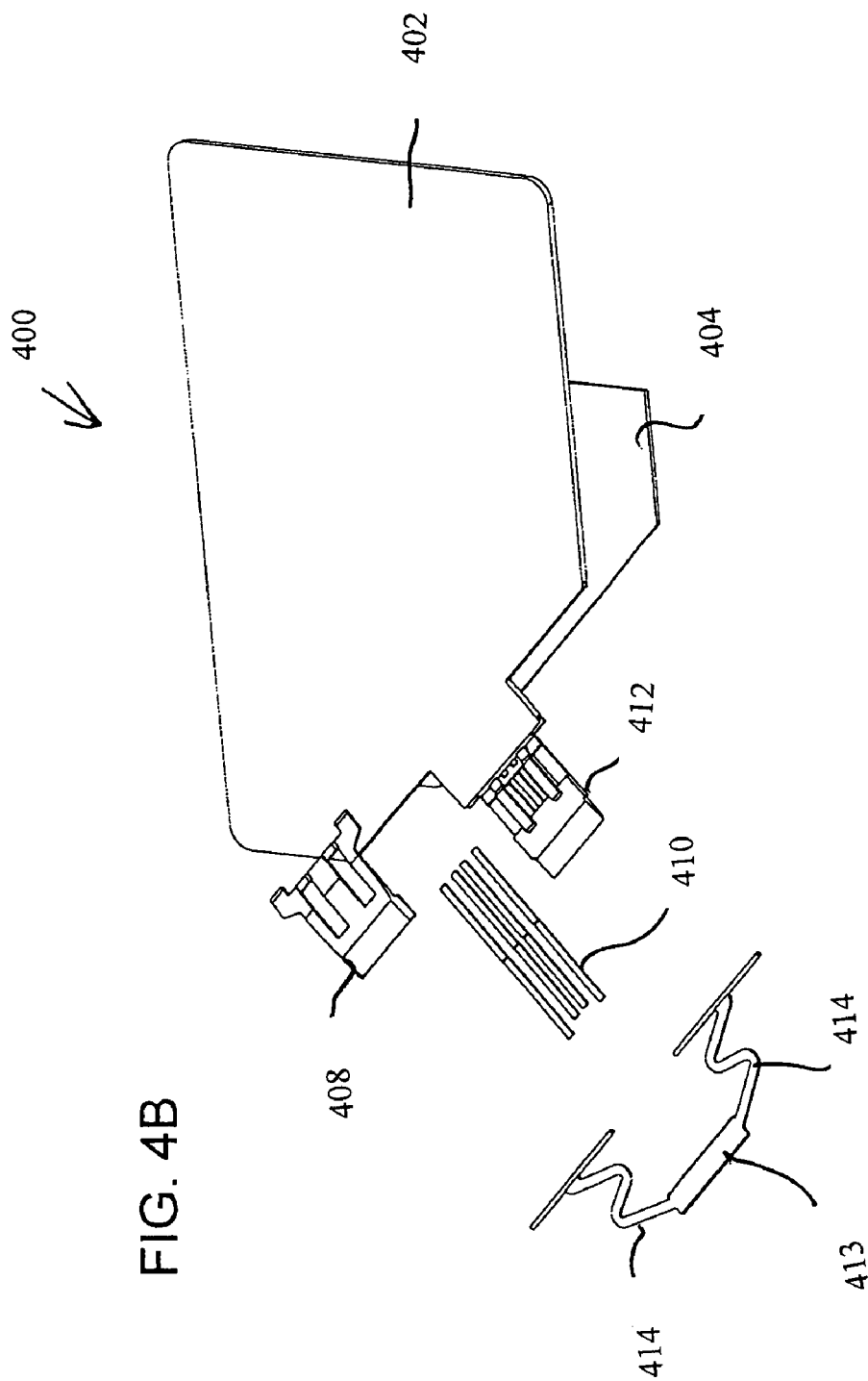
FIG. 4B is an exploded isometric view of the device of FIG. 4A.
Figure 4C:
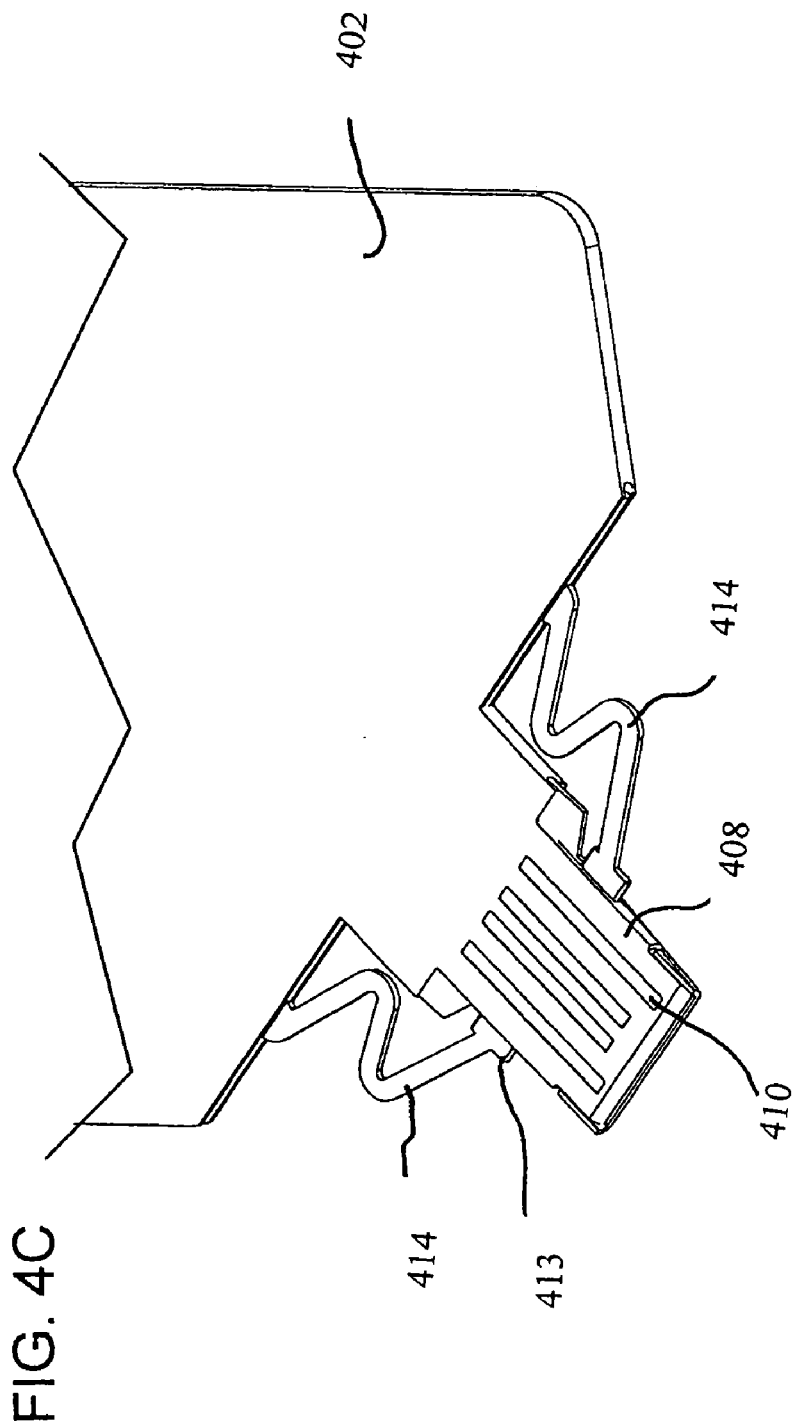
FIG. 4C is an enlarged partial isometric view showing a plug arrangement of the device of FIG. 4A.
Figure 4D:
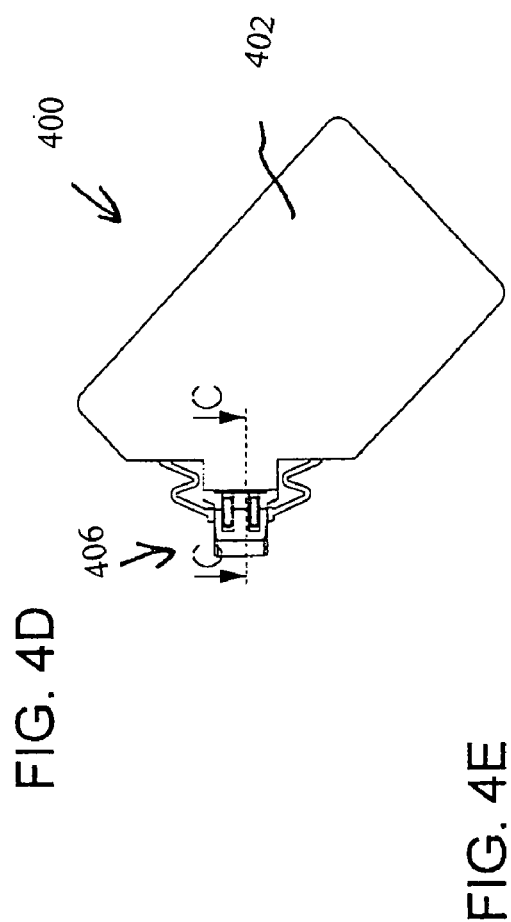
FIG. 4D is a plan view of the device of FIG. 4A showing a line designated C-C.
Figure 4E:
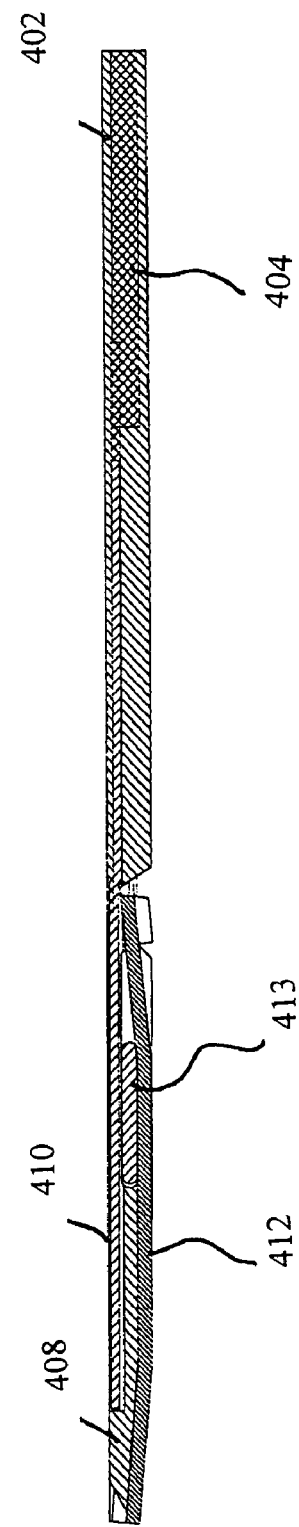
FIG. 4E is a cross-sectional view along the line C-C of FIG. 4D showing the plug arrangement in its non-deployed configuration.
Figure 5F:
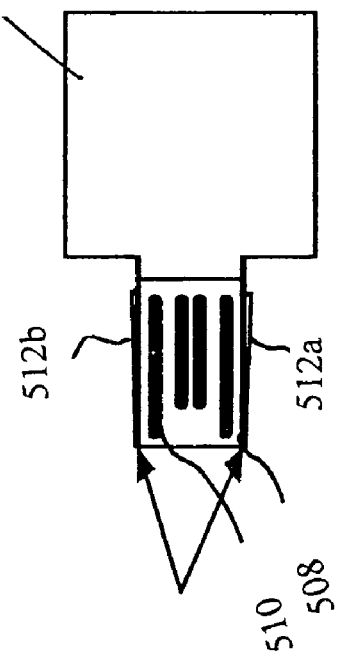
FIGS. 5E-5H are schematic views paralleling FIGS. 5A-5D, respectively, showing the plug arrangement in its deployed configuration.
Figure 5G:
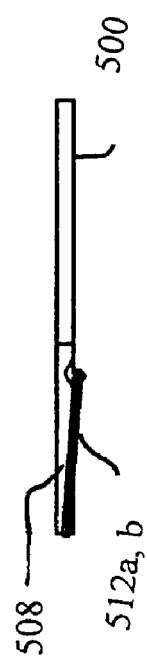
Figure 5H:
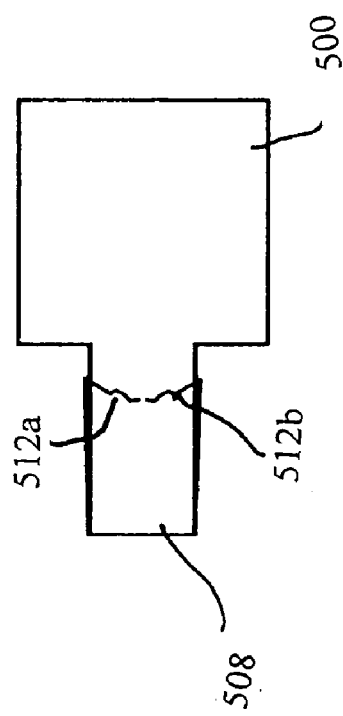
Figure 5E:
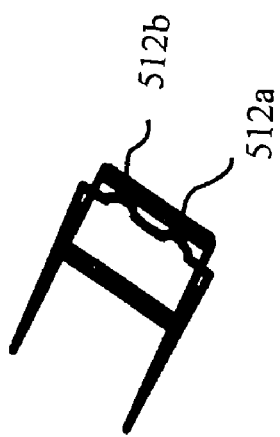

Optionally, in order to increase stability of the plug arrangement within a connector, the distal extremity of the plug arrangement may be provided with a pivotally mounted flap 316 which is up-turned along its edge so as to be lifted as it reaches the end of the connector socket, thereby wedging the end of the plug arrangement into a sell-defined and stable orientation within the socket as shown in FIG. 3K. It should be noted that this element may optionally be included in other similar implementations, such as in the implementation described below with reference to FIGS. 4A-4G.

According to a further particularly preferred feature of this embodiment, body 302 is shaped as a rectangle with a diagonally truncated corner, and plug arrangement 306 is deployed along the diagonally truncated corner so as to lie within the generally rectangular outline. This renders device 300 compatible with regular credit card wallets and other standard storage arrangements for a credit card form factor.

Turning now to FIG. 4A-4G, these show a fourth embodiment of a thin peripheral device, generally designated 400, constructed and operative according to the teachings of the present invention, for mating with an electrical connector 420. Device 400 is generally similar to device 300 in all respects other than the implementation of a plug arrangement 406. Specifically, in this case, a first plug portion 408 carrying electric contacts 410 is fixed, and the required thickness increase is achieved by pivoting of a second plug portion 412 without contacts. Other components of device 400 include body 402, PCB 404, lifting member 413 and springs 414 are all analogous in structure and function to the corresponding body 302, PCB 304, lifting member 313 and springs 314 of device 300 described above.

Turning now to FIGS. 5A-5H, these show a fifth embodiment of a thin peripheral device, generally designated 500, constructed and operative according to the teachings of the present invention. Device 500 is similar to device 400 to the extent that it employs a fixed first plug portion 508 with electrical contacts 510, and that the thickness increase required for mating with a connector is actuated by insertion of the plug configuration into the connector. Device 500 however differs from all of the embodiments described above, primarily in that second plug portion is implemented as at least one spring element 512a, 512b which is resiliently deformable so as to vary an effective thickness of the plug arrangement between the non-deployed configuration (FIGS. 5A-5D) and the deployed configuration (FIGS. 5E-5H).

The increased thickness of the plug arrangement in the deployed state may be achieved by increasing the degree of overlap between first plug portion 508 and spring elements 512a, 512b such that the physical dimensions of the overlapping elements add up to the required thickness. Alternatively, or additionally, spring elements 512a, 512b are configured to flex or buckle in such a manner as to increase their effective thickness when deformed to their deployed configuration.

Turning now to the remaining FIGS. 6A-6L and 7A-7J, these show two further embodiments of the present invention based upon the principle of folding part of the device on itself to temporarily increase the thickness of the plug arrangement by overlap of the portions. Thus, in general terms, these embodiments include first and second plug portions which are substantially non-overlapping in their non-deployed configuration. The deployed configuration is achieved by folding at least one of the first and second plug portions about an effective hinge axis so that the first and second plug portions are brought into overlapping relation to form the effective plug. The term "folding" is used in this context to refer to relative rotation between two parts of the device about an effective axis which is in-plane with the device, i.e., lies within or adjacent to the body of the device parallel to the main upper and lower faces of the device. This motion may also be defined by the result that it brings two surfaces which were initially facing the same way (e.g., downward facing) into face-to-face contact.

Figure 6D:
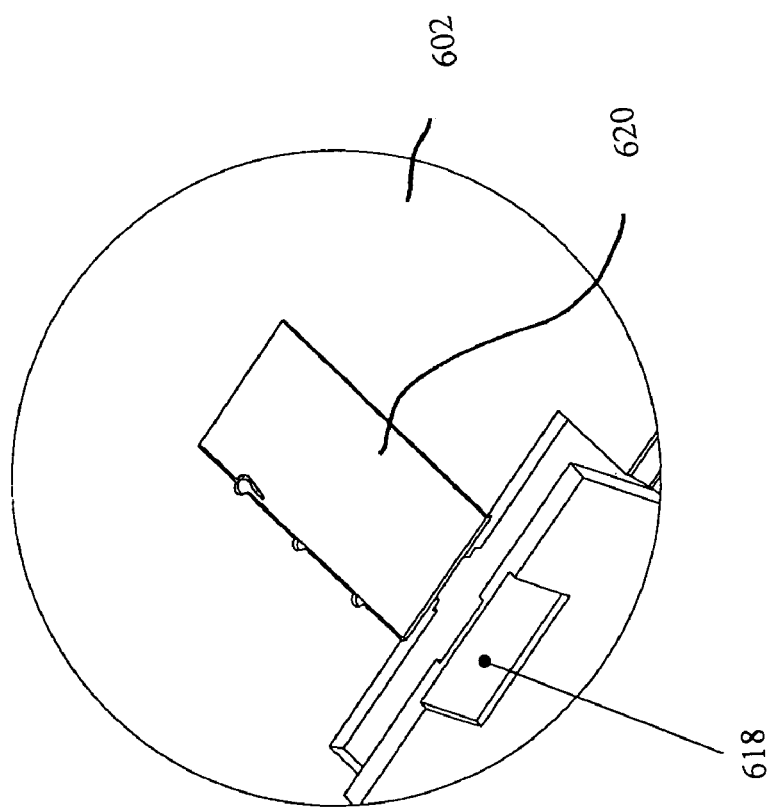
FIG. 6D is an enlarged view of a region of FIG. 6C designated by circle "B"
Figure 6C:
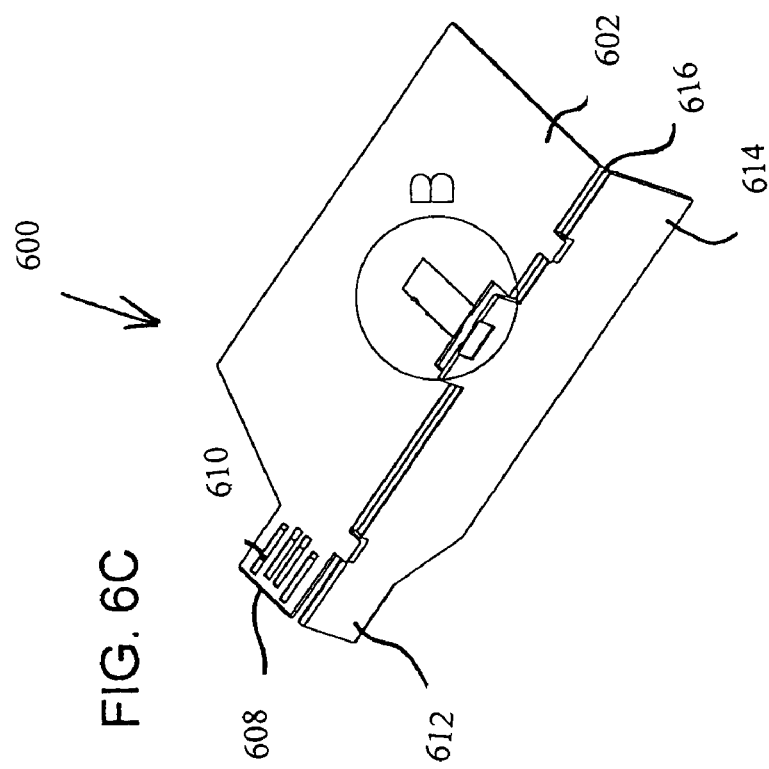
FIG. 6C is an isometric view showing the device of FIG. 6A in an intermediate position during a folding motion which generates an increased thickness deployed configuration of a plug arrangement.
Figure 6E:
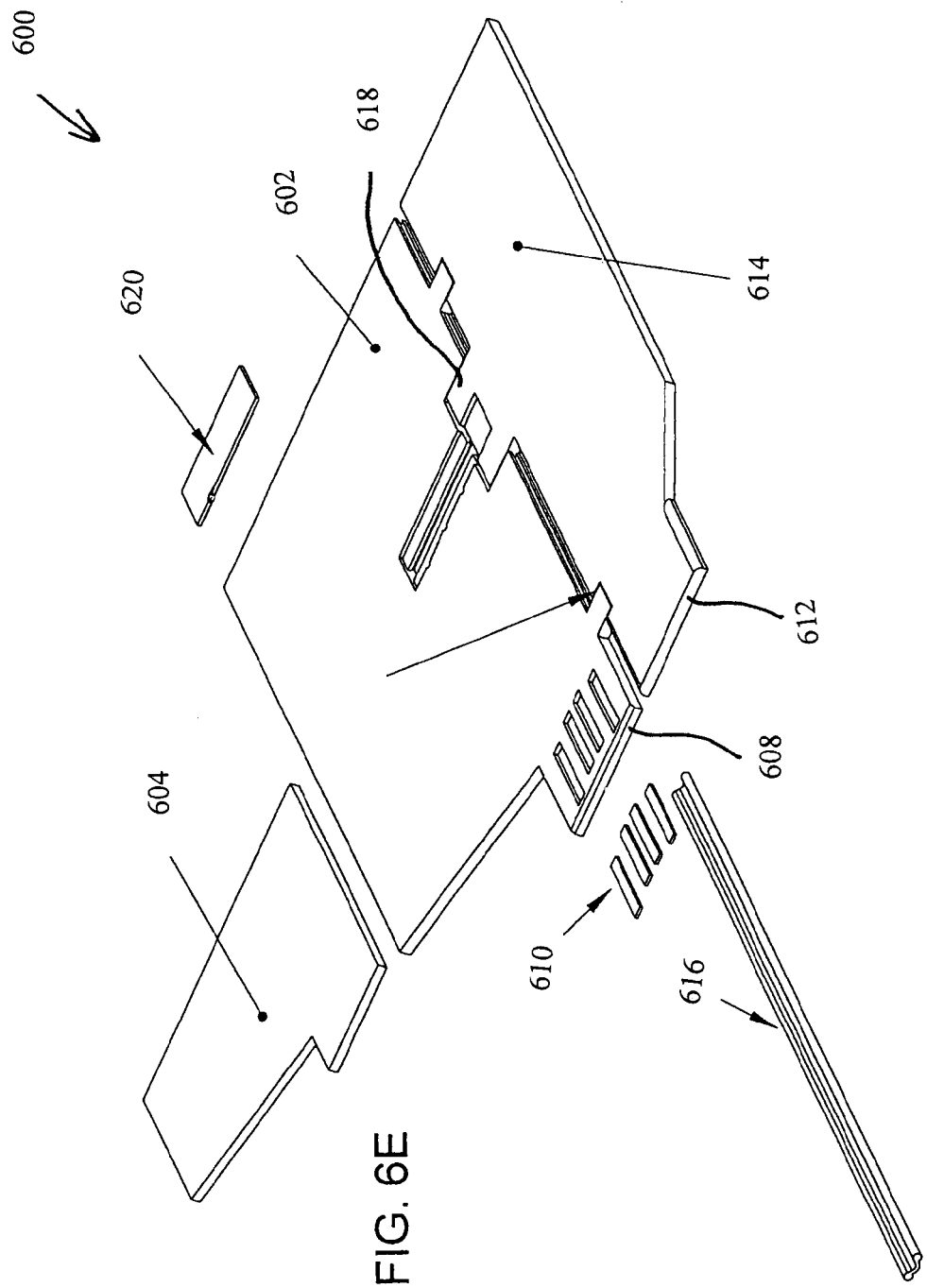
FIG. 6E is an isometric exploded view showing the main components of the device of FIG. 6A.
Figure 7E:
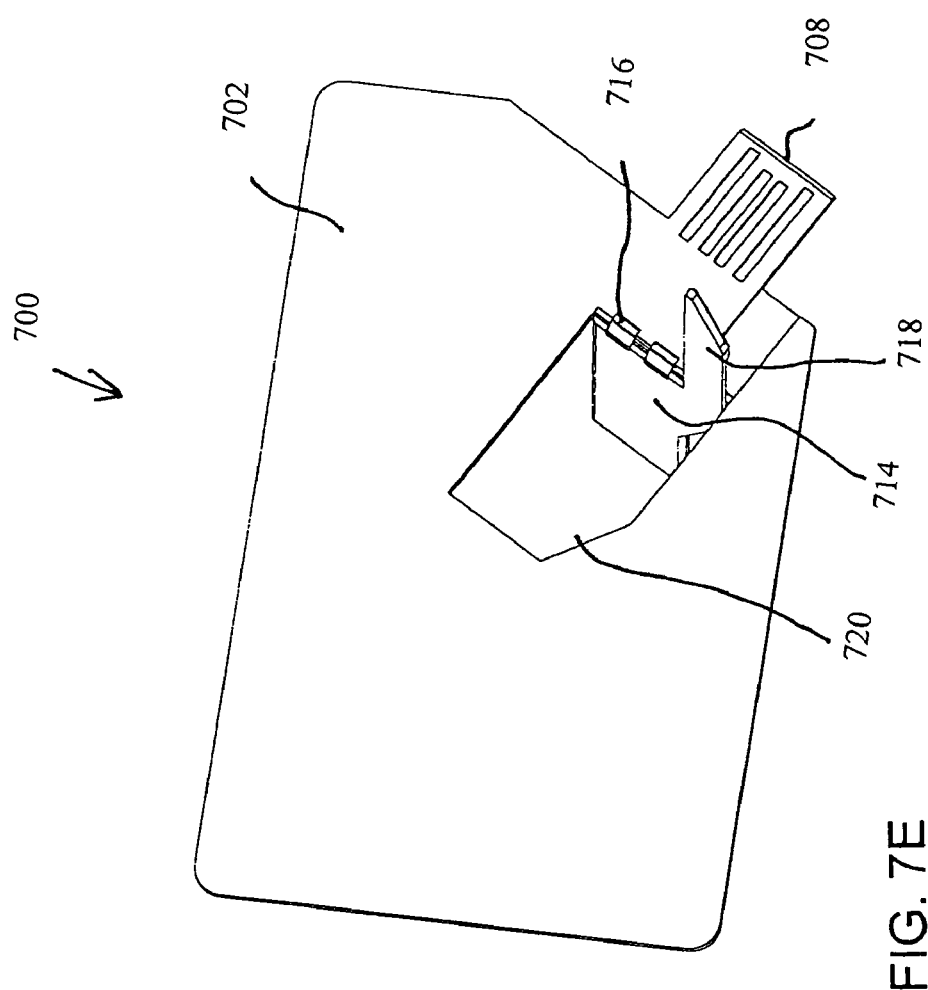
FIG. 7E is an isometric view showing the device of FIG. 7A in an intermediate position during a folding motion of the flap which generates an increased thickness deployed configuration of the plug arrangement.
Figure 7F:
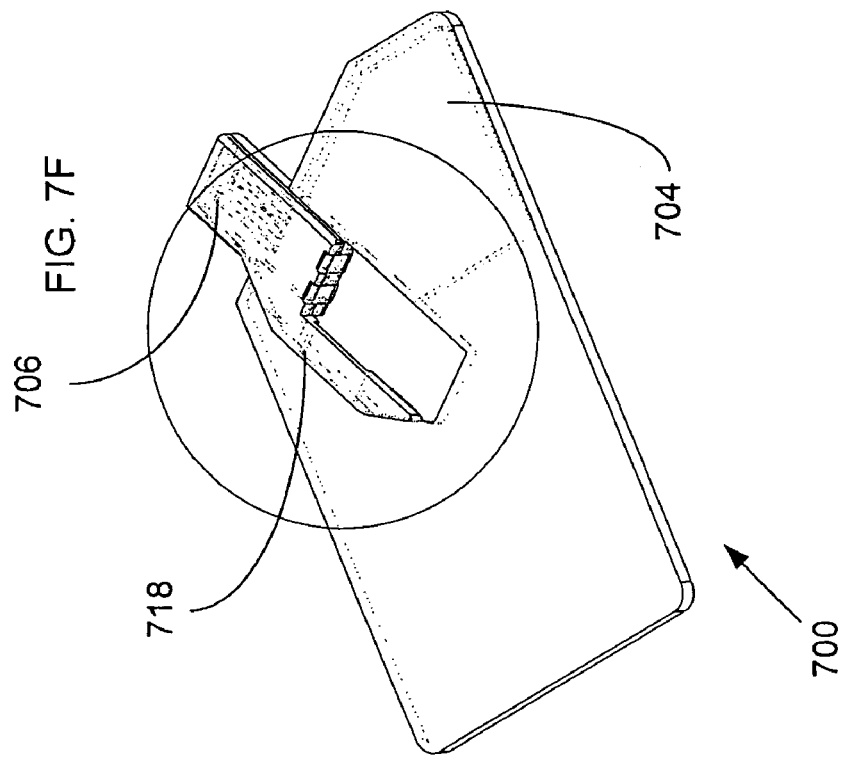
FIG. 7F is a lower isometric view of the device of FIG. 7A showing the flap in its fully folded position.
Figure 7G:
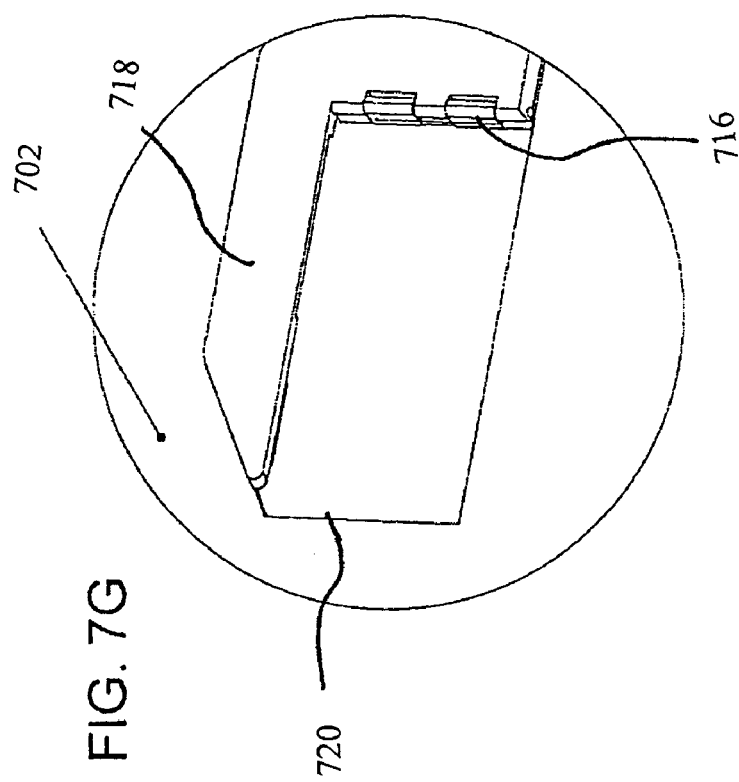
FIG. 7G is an enlarged view of the region of FIG. 7F designated by circle "B"
Figure 8:
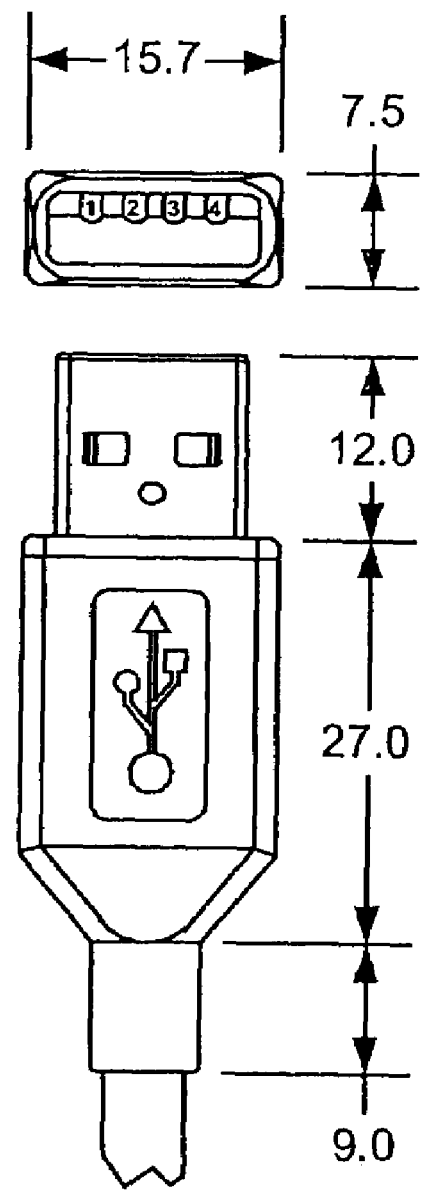
FIG. 8, described above, shows a drawing of standard USB A-type plug.

Turning now specifically to FIGS. 6A-6L, these show a sixth embodiment of a thin peripheral device, generally designated 600, constructed and operative according to the teachings of the present invention. Device 600 has a body 602 including electronic circuitry, typically formed on a circuit layer such as a printed circuit board ("PCB") 604 (FIGS. 6B and 6E). Device 600 also includes a selectively deployable plug arrangement 606 having a first plug portion 608 carrying a plurality of electric contacts 610 and a second plug portion 612. In this case, second plug portion 612 is part of a folding flap 614 attached along one side of body 602 at a hinge connection 616. Hinge connection 616 of this embodiment is substantially parallel to the direction of insertion of the resulting plug into an electrical connector. Folding flap 614 of this implementation is peripheral to body 602 such that, in the unfolded non-deployed configuration, the total dimensions of the device are the sum total of body 602 and folding flap 614.

Optionally, electronic circuitry of device 600 may be included in both body 602 and folding flap 614. In such a case, the electronic circuitry may be interconnected by a flexible contact strip passing through the hinge connection, as is known in the art. It is also possible for second plug portion 612 to be implemented with independent electrical contacts (not shown) such that device 600 is reversible and functions as two separate devices depending upon which way up it is inserted.

According to a further option, this and other embodiments of the present invention may be implemented as a reversible plug which can be mated with a receptacle in either of two orientations (i.e., either way up). In this case, both first and second plug portions are implemented with a set of electrical contact and are configured such that, in a first coupling orientation of the reversible plug with the receptacle, the electrical contacts of the first plug portion are mechanically connected with electrical contacts of the standard receptacle, and in a second coupling orientation of the reversible plug with the receptacle, the electrical contacts of the second plug portion are mechanically connected with the electrical contacts of the standard receptacle. Examples for implementation of electrical connections for such reversible USB plugs may be found in co-pending, co-assigned U.S. patent application Ser. No. 11/185,771, filed Jul. 21, 2005, which is hereby incorporated in its entirety by reference.

Notwithstanding these option, in many cases, it is preferable for reasons of simplicity of manufacture to include all of the electronic circuitry of device 600 in body 602 which has a non-rotating mechanical interconnection with electric contacts 610, thereby simplifying the structure.

Hinge connection 616 may be implemented in a number of ways within the capabilities of one ordinarily skilled in the art. In the preferred but non-limiting example illustrated here, hinge connection 616 is implemented by insertion of a separate flexible hinge element, best seen in FIG. 6E, into corresponding recesses formed in the facing edges of body 602 and folding flap 614. Alternatively, if body 602 is formed from materials with suitable mechanical properties, hinge connection 616 may advantageously be implemented as an integral hinge from the material of body 602, In most preferred cases, the hinge connection is implemented to allow 180° folding with sufficient freedom of motion to allow the two parts to fold flat against each other. It should be noted, however, that alternative implementations (not shown) are possible in which two plug portions each fold by a smaller angle, such as 90°, so as to come together in overlapping relation to form an effective plug projecting out-of-plane relative to device 600.

In order to avoid unintended folding of the device when in its flat non-deployed configuration, device 600 preferably features a lock configuration selectively deployable to prevent folding of the plug portions about the effective hinge axis, thereby retaining the body in the non-deployed configuration. In the example shown here, folding flap 614 is formed with a tab 618 extending beyond the axis of hinge connection 616 into a corresponding recess of body 602.

Since the adjacent edges of tab 618 and the adjacent edge of body 602 are off axis relative to the hinge connection, folding of flap 614 results in significant out of plane displacement of tab 618 relative to body 602. A sliding lock element 620 is deployed in a track formed in body 602 so as to selectively overlap a corresponding depression formed in tab 618, thereby locking flap 614 against unintended folding. The locked state is illustrated in FIG. 6M. When the user wishes to prepare the device for mating with an electrical connector, sliding lock element 620 is first retracted onto body 602 as shown in FIG. 6A so as not to overlap tab 618, thereby allowing folding.

Similarly, in order to avoid unintended opening of the device when in its folded deployed configuration, device 600 preferably also features a lock configuration selectively deployable to retain the body in the deployed configuration. In the particularly preferred implementation illustrated here, the lock configuration for retaining the deployed configuration is implemented using the same lock configuration as described above for preventing undesired folding of the device. Thus, as shown in FIGS. 6F, 6G, 6H and 6K, in the fully folded position, the reverse side of tab 618 lies beneath sliding lock element 620. Sliding lock element 620 is preferably formed with an increased thickness portion which is set back from the leading edge of tab 618 so as to remain within body 602 in the locked non-deployed configuration but which extends beyond body 602 when sliding lock element is extended further to a folded locking position as best seen in FIG. 6G. This increased thickness portion then abuts the rear surface of tab 618, thereby locking folding flap 614 in its folded plug-forming position.

Preferably, a resilient retaining configuration keeps sliding lock element 620 in the desired one of its three positions, i.e., unlocked (fully retracted), locked non-deployed configuration (half extended) or locked deployed configuration (fully extended). A suitable retaining configuration may be implemented in a manner similar to that described above for slide 114 with reference to FIGS. 1E and 1H.

It will be clear that the lock configurations described above can readily be implemented in other ways, including but not limited to, reversal of the arrangement with a sliding lock element deployable from folding flap 614 to selectively overlap body 602, and/or where the tab extends from body 602 into a recess formed in the folding flap. Similarly, any other locking arrangement may be used.

FIGS. 6J, 6K and 6L show the folded device mated with a standard USB A-type socket electrical connector 630.

Turning finally to FIGS. 7A-7J, these show a seventh embodiment of a thin peripheral device, generally designated 700, constructed and operative according to the teachings of the present invention. Device 700 is generally similar to device 600, having a body 702 including a PCB 704, and a selectively deployable plug arrangement 706 having a first plug portion 708 carrying a plurality of electric contacts 710 and a second plug portion 712. Device 700 differs from device 600 primarily in that second plug portion 712 is here provided as part of a folding flap 714 which is substantially surrounded by body 702 in the non-deployed configuration, and which is attached to body 702 at a hinge connection 716 which is substantially perpendicular to the direction of insertion of the resulting plug into an electrical connector.

Optionally, folding flap 714 may include a manipulable tab 718 which extends on the opposite side of the axis of hinge connection. In the particularly preferred implementation shown here, second plug portion 712 is initially inset within a specially shaped opening 720 formed in body 702 such that, when the flap is flipped to its deployed configuration, an edge of manipulable tab 718 frictionally engages part of the rim of opening 720, thereby retaining the device in the deployed configuration until the user manually presses against manipulable tab 718 to return flap 714 to its non-deployed configuration.

FIGS. 7H and 7J show the device 700 in its deployed configuration and mated with a standard USB A-type socket electrical connector 730.

In all other respects, the structure and function of device 700 may be understood by analogy to that of device 600 described above.

It will be appreciated that the above descriptions are intended only to serve as examples, and that many other embodiments are possible within the scope of the present invention as defined in the appended claims.

What is claimed is:

1. A thin peripheral device for mating with an electrical connector having a minimum engagement thickness, the peripheral device comprising a body including electronic circuitry, said electronic circuitry including a memory storage device, said body further including a selectively deployable plug arrangement having:
   (a) a first plug portion including a plurality of electric contacts; and
   (b) a second plug portion,
wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector.

2. The peripheral device of claim 1, wherein said thickness dimension of said body is less than 2 millimeters.

3. The peripheral device of claim 1, wherein said body is configured in said non-deployed configuration as a card having a substantially uniform thickness less than 2 millimeters.

4. The peripheral device of claim 1, wherein said memory storage device is comprised of a non-volatile memory unit having a capacity of at least 32 MB.

5. The peripheral device of claim 1, wherein said first and second plug portions are at least partially overlapping in said non-deployed configuration, and wherein said deployed configuration is achieved by separating between at least part of said first and second plug portions.

6. The peripheral device of claim 5, wherein said first and second plug portions are hingedly interconnected.

7. The peripheral device of claim 5, wherein said electric contacts are deployed on a surface of said first plug portion facing towards said second plug portion.

8. The peripheral device of claim 7, wherein a surface of said first plug portion facing away from said second plug portion is at least partially covered by electrical insulation.

9. The peripheral device of claim 5, wherein said electric contacts are deployed on a surface of said first plug portion facing away from said second plug portion.

10. The peripheral device of claim 5, wherein at least a surface of said second plug portion facing away from said first plug portion in said deployed configuration is at least partially formed from conductive electrical shielding.

11. The peripheral device of claim 5, wherein said plug arrangement further includes a displaceable lifting member selectively deployable between said first and second plug portions so as to separate said first and second plug portions from said non-deployed configuration to said deployed configuration.

12. The peripheral device of claim 1, wherein said effective plug is deployed in predefined spatial relation to the remainder of said body.

13. A thin peripheral device for mating with an electrical connector having a minimum engagement thickness, the peripheral device comprising a body including electronic circuitry, said body further including a selectively deployable plug arrangement having:
(a) a first plug portion including a plurality of electric contacts; and
(b) a second plug portion,
wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector, and wherein said effective plug is configured for mating with a standard USB A-type receptacle.

14. The peripheral device of claim 13, wherein said effective plug is configured such that said first and second plug portions both engage within a hollow of said standard USB A-type receptacle between a contact block and an opposing portion of a shielding sleeve.

15. The peripheral device of claim 13, wherein said effective plug is configured such that said first plug portion and said second plug portion engage opposite faces of a contact block of said standard USB A-type receptacle with said second plug portion inserted between a shielding sleeve and a reverse side of said contact block.

16. A thin peripheral device for mating with an electrical connector having a minimum engagement thickness, the peripheral device comprising a body including electronic circuitry said body further including a selectively deployable plug arrangement having:
(a) a first plug portion including a plurality of electric contacts; and
(b) a second plug portion,
wherein at least part of said plug arrangment is selectively displaceable relative to a remainder of said body between a non-deployed configuration wherein said entire arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector,
wherein said first and second plug portions are at least partially overlapping in said non-deployed configuration, and wherein said deployed configuration is achieved by separating between at least part of said first and second plug portions, and wherein said plug arrangement further includes a slide arrangement defining a sliding path of at least one of said first and second plug portions relative to said body such that, in said non-deployed configuration, said first and second plug portions lie within a periphery of said body, and such that, when said at least one of said first and second plug portions is advanced along said sliding path, said first and second plug portions form said deployed configuration defining an effective plug.

17. The peripheral device of claim 16, wherein said plug arrangement further includes a lifting member associated with said body such that, when said first and second plug portions are advanced along said sliding path, said first and second plug portions pass over said lifting member, thereby separating said first and second plug portions to form said deployed configuration.

18. The peripheral device of claim 16, wherein said electronic circuitry is implemented as part of a circuit layer mechanically associated so as to slide together with said first plug portion.

19. The peripheral device of claim 16, wherein said plug arrangement further includes a slide actuator externally exposed for manual displacement by a finger of a user so as to displace said first and second plug portions along said sliding path.

20. The peripheral device of claim 16, wherein said slide arrangement further includes a retention configuration for retaining said plug arrangement in at least one of said non-deployed configuration and said deployed configuration.

21. A thin peripheral device for mating with an electrical connector having a minimum engagement thickness, the peripheral device comprising a body including electronic circuitry, said body further including a selectively deployable plug arrangement having:
(a) a first plug portion including a plurality of electric contacts; and
(b) a second plug portion,
wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector,
wherein said first and second plug portions are at least partially overlapping in said non-deployed configuration, and wherein said deployed configuration is achieved by separating between at least part of said first and second plug portions, and wherein said plug arrangement further includes a displaceable lifting member selectively deployable between said first and second plug portions so as to separate said first and second plug portions from said non-deployed configuration to said deployed configuration and further comprising a lifting member actuator mechanically linked to said lifting member and configured such that, when said plug arrangement is inserted into a connector surrounded by a rim, abutment of said lifting member actuator against said rim causes deployment of said lifting member between said first and second plug portions.

22. The peripheral device of claim 21, wherein said lifting member actuator is resiliently biased to a position which allows said first and second plug portions to return to said non-deployed configuration.

23. A thin peripheral device for mating with an electrical connector having a minimum engagement thickness, the peripheral device comprising a body including electronic circuitry, said body further including a selectively deployable plug arrangement having:

(a) a first plug portion including a plurality of electric contacts; and (b) a second plug portion, wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector, and wherein said second plug portion includes at least one spring element resiliently deformable so as to vary an effective thickness of said plug arrangement between said non-deployed configuration and said deployed configuration.

24. The peripheral device of claim 23, wherein said at least one spring element is biased to assume said non-deployed configuration, and wherein said at least one spring element is configured such that insertion of said plug arrangement into the connector causes deformation of said spring element to assume said deployed configuration.

25. A thin peripheral device for mating with an electrical connector having a minimum engagement thickness, the peripheral device comprising a body including electronic circuitry, said body further including a selectively deployable plug arrangement having:

(a) a first plug portion including a plurality of electric contacts; and (b) a second plug portion, wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector, and wherein said first and second plug portions are substantially non-overlapping in said non-deployed configuration, and wherein said deployed configuration is achieved by folding at least one of said first and second plug portions about an effective hinge axis so that said first and second plug portions are brought into overlapping relation to form said effective plug.

26. The peripheral device of claim 25, wherein said deployed configuration is achieved by folding one of said first and second plug portions through an angle of about 180° while the other of said first and second plug portions is not folded.

27. The peripheral device of claim 25, wherein said body further includes a lock configuration selectively deployable to prevent folding of said plug portions about said effective hinge axis, thereby retaining said body in said non-deployed configuration.

28. The peripheral device of claim 25, wherein said body further includes a lock configuration selectively deployable to retain said body in said deployed configuration.

29. The peripheral device of claim 25, wherein said second plug portion is part of a peripheral flap connected by a hinge configuration extending along an external periphery of said body.

30. The peripheral device of claim 25, wherein one of said first and second plug portions is implemented as a flap substantially surrounded by said body in said non-deployed configuration, said flap being rotatable about said effective hinge axis through an angle of about 180° so as to form said deployed configuration.

31. A thin peripheral device for mating with an electrical connector having a minimum engagement thickness, the peripheral device comprising a body including electronic circuitry said body further including a selectively deployable plug arrangement having:

(a) a first plug portion including a plurality of electric contacts; and (b) a second plug portion, wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector, and wherein said second plug portion includes a plurality of electric contacts, said effective plug being configured as a reversible plug for coupling with a standard USB A-type receptacle such that:

(a) in a first coupling orientation of the reversible plug with the receptacle, said electrical contacts of said first plug portion are mechanically connected with electrical contacts of the standard receptacle; and (b) in a second coupling orientation of the reversible plug with the receptacle, said electrical contacts of said second plug portion are mechanically connected with the electrical contacts of the standard receptacle.

32. A thin peripheral device for mating with an electrical connector having a minimum engagement thickness, the peripheral device comprising a body including electronic circuitry, said electronic circuitry including a memory storage device, said body further including a selectively deployable plug arrangement having a plurality of electric contacts, wherein said plug arrangement is selectively deployable between a non-deployed configuration wherein said entire plug arrangement lies within a thickness dimension of said body that is less than the minimum engagement thickness of the electrical connector and a deployed configuration in which said plug arrangement forms an effective plug having a thickness that is at least the minimum engagement thickness of the electrical connector.

33. The peripheral device of claim 32, wherein said memory storage device comprises a non-volatile memory unit having a capacity of at least 32 MB.

34. The peripheral device of claim 32, wherein said effective plug is deployed in predefined spatial relation to a remainder of said body.

35. A thin storage device for mating with an electrical connector having a minimum engagement thickness, the storage device comprising a body including a memory unit having the capacity of at least 32 MB, said body further including a selectively deployable plug arrangement having:

(a) a first plug portion including a plurality of electric contacts; and (b) a second plug portion, wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector.

36. The thin storage device of claim 35, wherein said effective plug has a width dimension for engaging a width of the electrical connector, and wherein two orthogonal dimensions of said body perpendicular to said thickness dimension are greater than said width.

37. The thin storage device of claim 35, wherein said effective plug is deployed in predefined spatial relation to the remainder of said body.

38. A thin peripheral device for mating with an electrical connector having a minimum engagement thickness, the peripheral device comprising a body including electronic circuitry, said body further including a selectively deployable plug arrangement having:
   (a) a first plug portion including a plurality of electric contacts; and
   (b) a second plug portion,
   wherein at least part of said plug arrangement is selectively displaceable relative to a remainder of said body between a non-deployed configuration wherein said entire plug arrangement lies within a thickness dimension of said body that is less than the minimum engagement thickness of the electrical connector and a deployed configuration wherein said first and second plug portions together define an effective plug having a thickness that is at least the minimum engagement thickness of the electrical connector, and wherein said effective plug has a width dimension for engaging a width of the electrical connector, and wherein two orthogonal dimensions of said body perpendicular to said thickness dimension are greater than said width.

39. A thin peripheral device for mating with an electrical connector having a minimum engagement thickness, the peripheral device comprising a body including electronic circuitry, said body further including a selectively deployable plug arrangement having a plurality of electric contacts, wherein said plug arrangement is selectively deployable between a non-deployed configuration wherein said entire plug arrangement lies within a thickness dimension of said body that is less than the minimum engagement thickness of the electrical connector and a deployed configuration in which said plug arrangement forms an effective plug having a thickness that is at least the minimum engagement thickness of the electrical connector, and wherein said effective plug has a width dimension for engaging a width of the electrical connector, and wherein two orthogonal dimensions of said body perpendicular to said thickness dimension are greater than said width.

* * * * *

UNITED STATES PATENT AND TRADEMARK OFFICE
CERTIFICATE OF CORRECTION

PATENT NO. : 7,381,076 B2  Page 1 of 1
APPLICATION NO. : 11/304746
DATED : June 3, 2008
INVENTOR(S) : Eyal Bychkov and Yohan Cohen It is certified that error appears in the above-identified patent and that said Letters Patent is hereby corrected as shown below:

Title page:
Item [56]

Domestic Priority Data is missing:
To add:
    US 60/642,861 Filed January 10, 2005

Claim 16, column 19 should be corrected as follows:

Line 49: insert the word --plug-- after "entire" before "arrangement"

Signed and Sealed this

Twelfth Day of August, 2008

JON W. DUDAS
*Director of the United States Patent and Trademark Office*